United States Patent [19]
Itoh et al.

[11] Patent Number: 6,052,678
[45] Date of Patent: *Apr. 18, 2000

[54] PROBLEM SOLVING OPERATION APPARATUS USING A STATE TRANSITION

[75] Inventors: Hiroyasu Itoh; Akio Shinagawa; Toshihiro Nishimura; Hiroyuki Okada; Nobue Adachi, all of Kawasaki; Hajime Ohi, Tokyo, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/356,979

[22] Filed: Dec. 16, 1994

[30] Foreign Application Priority Data

Dec. 16, 1993 [JP] Japan .................................. 5-316535

[51] Int. Cl.[7] ........................................ G06N 5/00
[52] U.S. Cl. ............................ 706/13; 706/20; 706/45
[58] Field of Search .............................. 364/200; 395/13, 395/135, 155, 113, 116; 706/13, 20, 45

[56] References Cited

U.S. PATENT DOCUMENTS

| | | | |
|---|---|---|---|
| 5,050,074 | 9/1991 | Marca ........................................... | 707/8 |
| 5,195,172 | 3/1993 | Elad et al. .................................. | 706/62 |
| 5,390,282 | 2/1995 | Koza et al. ................................ | 706/13 |

OTHER PUBLICATIONS

Patent Abstract, Japanese Patent No. 5–143572 issued Jun. 11, 1993 to Fujitsu Limited.

Encyclopedia of Operations Research and Management Science, by Saul I. Gass and Carl M. Harris, Kluwer Academic Publishers, 1996.

Goldberg, David E., Genetic Algorithms in Search, Optimization, and Machince Learning, Addison–Wesley Publishing Company Inc., 1989, pp. 166–179.

Miller, John A. et al., An Evaluation of Local Improvement Operators For Genetic Algorithms., IEEE Transactions on Systems, Man and Cybernetics, vol. 23, No. 5, Sep. 1, 1993.

Goldberg, David E., Genetic Algorithms in Search, Optimization, and Machine Learning, Addison–Wesley Publishing Company, Inc., Jan. 1, 1911.

Uckun, Serdar, Managing Genetic Search in Job Shop Scheduling, IEEE Expert, Jan. 1, 1911.

Miller et al. "An Evaluation of Local Improvement Operators for Genetic Algorithms," IEEE Transactions on Systems, Man, and Cybernetics, vol. 23, No. 5, p. 1340–1351, Oct. 31, 1993.

Uckun et al. "Managing Genetic Search in Job Shop Scheduling," IEEE Expert Magazine, vol. 8, Issue 5, p. 15–24, Oct. 31, 1993.

Goldberg, "Genetic Algorithms in Search, Optimization, and Machine Learning," Addison–Wesley, p. 59–70, Dec. 30, 1989.

*Primary Examiner*—Allen R. MacDonald
*Assistant Examiner*—Wilbert L. Starks, Jr.
*Attorney, Agent, or Firm*—Staas & Halsey LLP

[57] ABSTRACT

A problem solving operation apparatus obtains an optimum solution for a given problem through a combined use of a plurality of optimum solution search techniques of a genetic algorithm, and other search techniques like a hill climbing method. A combination of the optimum solution search techniques applied to each of a group of solution candidates varies according to each state. When a search efficiency in a single state is lowered, the problem solving operation apparatus immediately causes a state transition to the next state, thus enabling a search of an optimum solution through the use of another combination of more efficient optimum solution search techniques. Because a state transition constantly maintains a high search efficiency, this problem solving operation apparatus can reach an optimum solution in a short amount of time.

23 Claims, 24 Drawing Sheets

FIG. 5

| X | Y |
|---:|---:|
| 200.000000 | 100.000000 |
| 199.802673 | 106.279052 |
| 199.211470 | 112.533323 |
| 198.228725 | 118.738131 |
| 196.858316 | 124.868989 |
| 195.105652 | 130.901699 |
| 192.977649 | 136.812455 |
| 190.482705 | 142.577929 |
| 187.630668 | 148.175367 |
| 184.432793 | 153.582679 |
| 180.901699 | 158.778525 |
| 177.051324 | 163.742399 |
| 172.896863 | 168.454711 |
| 168.454711 | 172.896863 |
| 163.742399 | 177.051324 |
| 158.778525 | 180.901699 |
| 153.582679 | 184.432793 |
| 148.175367 | 187.630668 |
| 142.577929 | 190.482705 |
| 136.812455 | 192.977649 |
| 130.901699 | 195.105652 |
| 124.868989 | 196.858316 |
| 118.738131 | 198.228725 |
| 112.533323 | 199.211470 |
| 106.279052 | 199.802673 |
| 100.000000 | 200.000000 |
| 93.720948 | 199.802673 |
| 87.466677 | 199.211470 |
| 81.261869 | 198.228725 |
| 75.131011 | 196.858316 |
| 69.098301 | 195.105652 |
| 63.187545 | 192.977649 |
| 57.422071 | 190.482705 |
| 51.824633 | 187.630668 |
| 46.417321 | 184.432793 |
| 41.221475 | 180.901699 |
| 36.257601 | 177.051324 |
| 31.545289 | 172.896863 |
| 27.103137 | 168.454711 |
| 22.948676 | 163.742399 |
| 19.098301 | 158.778525 |
| 15.567207 | 153.582679 |
| 12.369332 | 148.175367 |
| 9.517295 | 142.577929 |
| 7.022351 | 136.812455 |
| 4.894348 | 130.901699 |
| 3.141684 | 124.868989 |
| 1.771275 | 118.738131 |
| 0.788530 | 112.533323 |
| 0.197327 | 106.279052 |
| 0.000000 | 100.000000 |
| 0.197327 | 93.720948 |
| 0.788530 | 87.466677 |
| 1.771275 | 81.261869 |
| 3.141684 | 75.131011 |
| 4.894348 | 69.098301 |
| 7.022351 | 63.187545 |
| 9.517295 | 57.422071 |
| 12.369332 | 51.824633 |
| 15.567207 | 46.417321 |
| 19.098301 | 41.221475 |
| 22.948676 | 36.257601 |
| 27.103137 | 31.545289 |
| 31.545289 | 27.103137 |
| 36.257601 | 22.948676 |
| 41.221475 | 19.098301 |
| 46.417321 | 15.567207 |
| 51.824633 | 12.369332 |
| 57.422071 | 9.517295 |
| 63.187545 | 7.022351 |
| 69.098301 | 4.894348 |
| 75.131011 | 3.141684 |
| 81.261869 | 1.771275 |
| 87.466677 | 0.788530 |
| 93.720948 | 0.197327 |
| 100.000000 | 0.000000 |
| 106.279052 | 0.197327 |
| 112.533323 | 0.788530 |
| 118.738131 | 1.771275 |
| 124.868989 | 3.141684 |
| 130.901699 | 4.894348 |
| 136.812455 | 7.022351 |
| 142.577929 | 9.517295 |
| 148.175367 | 12.369332 |
| 153.582679 | 15.567207 |
| 158.778525 | 19.098301 |
| 163.742399 | 22.948676 |
| 168.454711 | 27.103137 |
| 172.896863 | 31.545289 |
| 177.051324 | 36.257601 |
| 180.901699 | 41.221475 |
| 184.432793 | 46.417321 |
| 187.630668 | 51.824633 |
| 190.482705 | 57.422071 |
| 192.977649 | 63.187545 |
| 195.105652 | 69.098301 |
| 196.858316 | 75.131011 |
| 198.228725 | 81.261869 |
| 199.211470 | 87.466677 |
| 199.802673 | 93.720948 |

| OPERATION / STATE | CARRYOVER | REPRODUCTION | CROSSOVER | MUTATION | PROXIMITY SEARCH | RECRUITMENT |
|---|---|---|---|---|---|---|
| STATE 0 | ○ | | | | | |
| STATE 1 | ○ | ○ | ○ | | | |
| STATE 2 | ○ | ○ | ○ | ○ | | |
| STATE 3 | ○ | ○ | ○ | ○ | ○ | ○ |

FIG. 8

DIVERSITY MEASURE = PREDETERMINED THRESHOLD VALUE FOR SUM OF STANDARD DEVIATIONS
GENERATION GAP MEASURE = GENERATION GAP RATE
GROWTH RATE MEASURE = PREDETERMINED THRESHOLD VALUE FOR GROWTH RATE
OF FITNESS VALUE
TERMINATION MEASURE = MAXIMUM NUMBER OF TIMES FOR PERFORMANCE

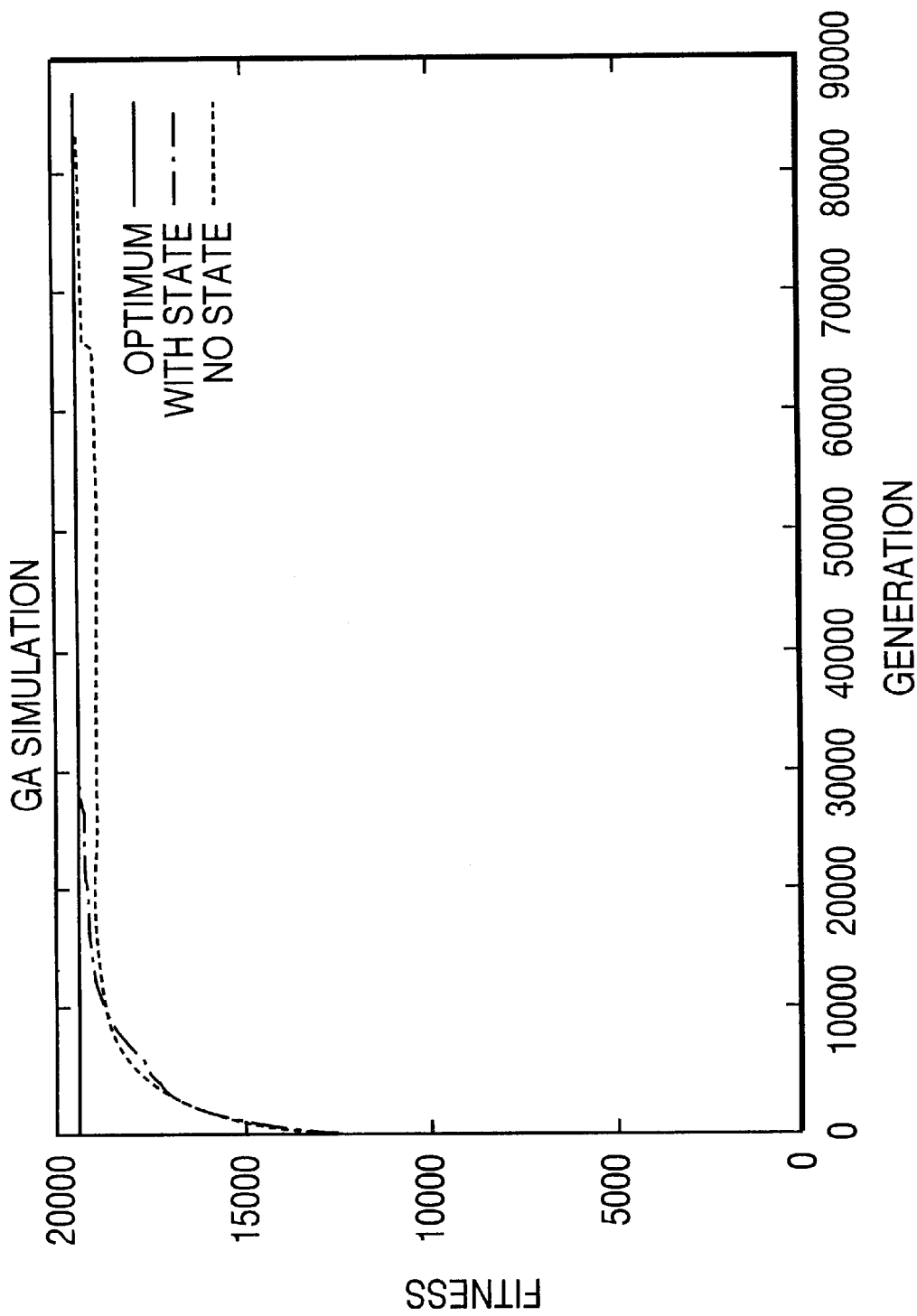

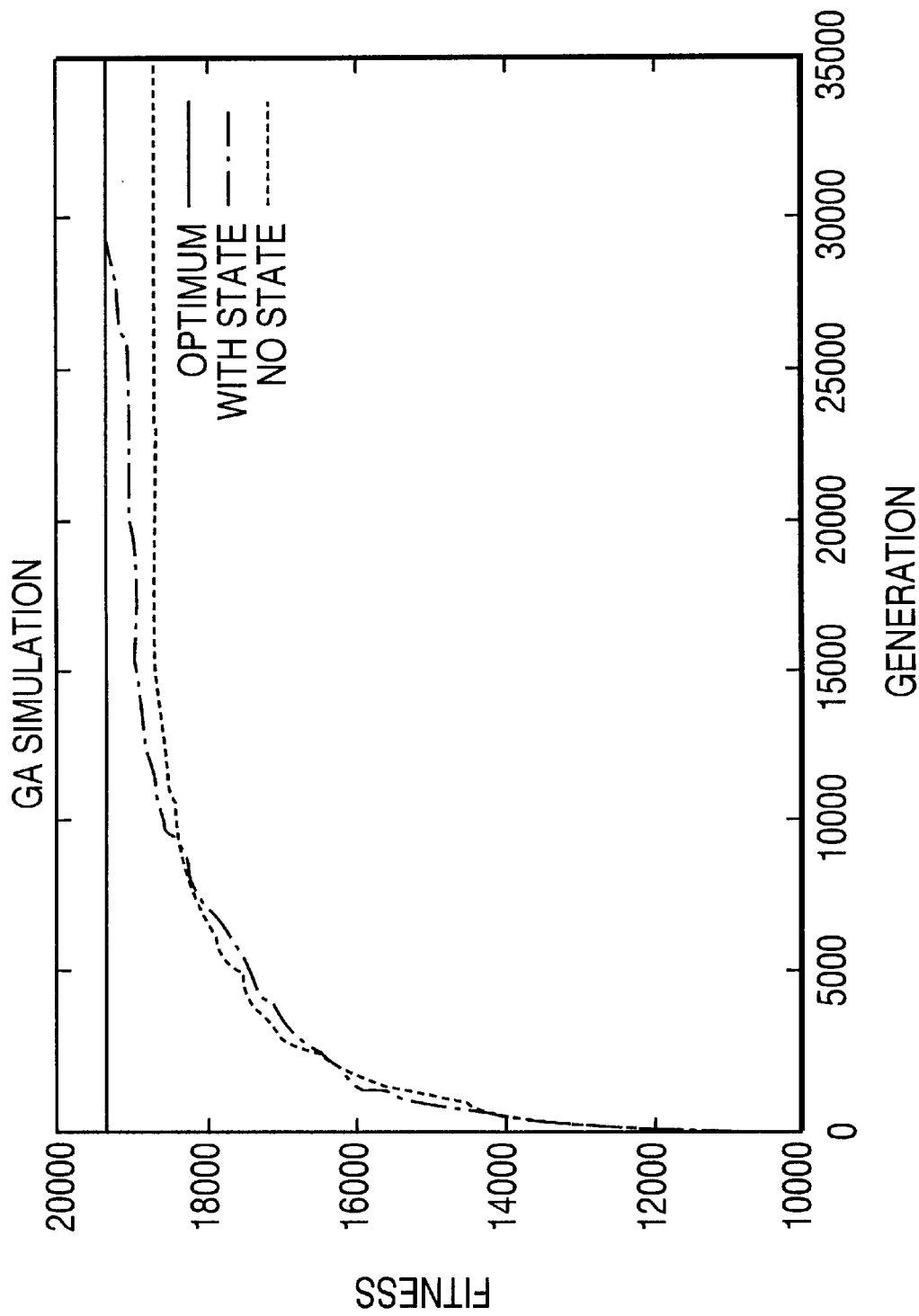

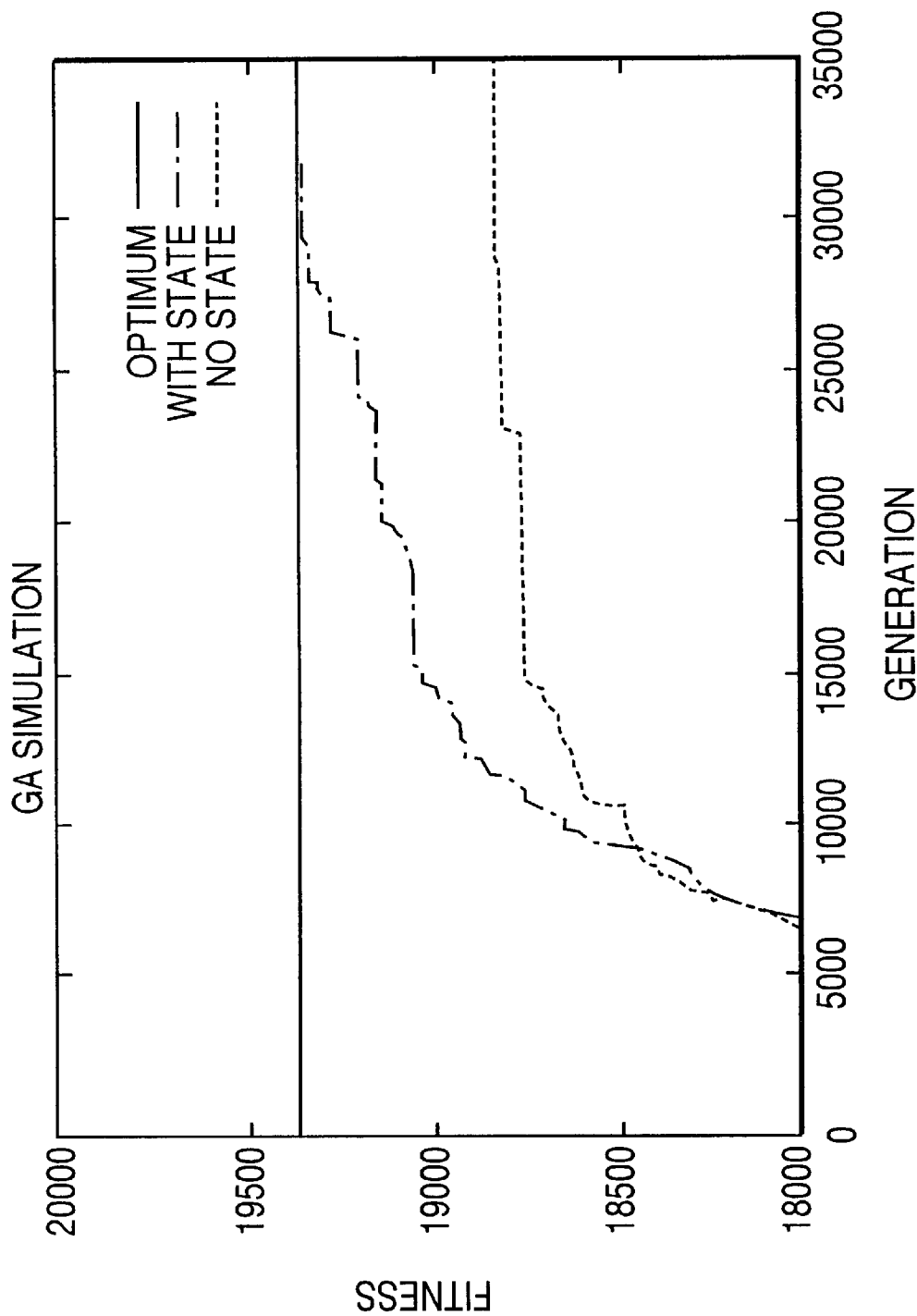

PROBLEM SOLVING OPERATION APPARATUS USING A STATE TRANSITION

BACKGROUND OF THE INVENTION

1. Field of the Invention

This invention pertains to a system for solving an optimization problem, such as a traveling salesman (salesperson) problem. More specifically, it pertains to a problem solving operation apparatus, with a concept of state transition introduced, for expediting a search for an optimum solution.

2. Description of the Related Arts

A problem solving operation apparatus to which this invention pertains is an apparatus for obtaining the solution of a generic mathematical programming problem. Such mathematical programming problems include traffic control, the determination of an optimum transmission path for a packet especially in a communications network, power supply routing control for an electrical power network, a determination in dispatching freight in traffic system, transportation scheduling problems e.g. for trains, busses and airplanes, a load distribution system amongst parallelly operating processors, and the routing control of a coupling network among processors.

On solving a traveling salesman problem, which is a mathematical programming problem of finding a route for traveling N cities in the shortest distance without a second visit, an attempt made to utilize a conventional technique for obtaining an optimum solution by searching and evaluating all possible combinations, will exponentially increase the computing time as the number of the cities N increases. Such a problem is called NP hard (nondeterministic polynomial hard). It has already been known that an algorithm for obtaining an optimum solution within a polynomial timeframe does not exist.

From the standpoint of strictness, i.e. the degree of optimization of an obtained solution, conventional optimization techniques for such a mathematical programming problem can be categorized broadly into two schemes, A1 being a strict solution method for obtaining a strict optimum solution, and A2 being an approximate solution method for fast obtaining an approximate optimum solution.

As well, from the standpoint of methods for searching solutions, the conventional optimization techniques can be categorized into three schemes, B1 being a common listing method for obtaining a strict solution through a strict listing or an equivalent listing, B2 being a discovery method for heuristically reducing solution candidates into a single solution by using rules for generating an optimum solution or an approximately optimum solution, and B3 being a searching method for obtaining an approximately optimum solution through the search of a partial area in a solution space.

A genetic algorithm (GA), one of such optimization techniques, can be classified as a combination of A2 and B3 described above. It is based on a search for an optimum solution, after generating an initial group comprising a plurality of individuals having random genes, through a repetition of three types of genetic operations composed of a reproduction process, a crossover process and a mutation process, until a search terminating condition is satisfied.

Here, a reproduction process is defined as an operation for determining individuals of the current generation by randomly selecting a few of the individuals of a group belonging to the preceding generation. A crossover process is defined as an operation of partially swapping chromosome of two individuals for generating new individuals as off-springs. A mutation process is a process for swapping alleles or transmuting parts of chromosomes of an individual of a group to become a succeeding generation. A conventional genetic algorithm causes these three types of genetic operations to be repeated until a terminating condition for the search of an optimum solution (or optimum solutions) is satisfied.

Such a technique of searching an optimum solution by applying a genetic algorithm to a mathematical programming problem, however, has a disadvantage that the growth of a fitness value, defined as the value which increases when an objective value for the solution gets close to its optimum value, slows down, when the value of the generation reaches a large value, after a number of generations have passed. That is, there is a problem that as the value of the generation increases, the growth rate of the fitness value decreases.

When a problem has a substantial number of local optima or complexities, the consideration of this disadvantage poses particular importance, because it is difficult to search a solution giving a practically optimum fitness value within a realistic timeframe.

SUMMARY OF THE INVENTION

This invention aims at obtaining a solution having a good objective value or a large fitness value at a small value of generation even for a large-scale complex problem through the use of a genetic algorithm.

The problem solving operation apparatus of this invention comprises a plurality of optimum solution search units, each of which obtains an optimum solution for a given problem by combining the use of some optimum solution search techniques. The optimum solution search techniques are based on operations, such as a reproduction process, a crossover process and a mutation process, for use in a genetic algorithm. The combinations of optimum solution search techniques differ from each other among optimum solution search units, which set themselves to states of concentrating the application of their proprietary combinations to a group of solution candidates.

During a searching process in one of the optimum solution search units, an objective value is calculated for each solution in the group, thereby mathematically evaluating excellency of the solution. When a state transition condition predetermined as a condition causing a transition from one state to another is satisfied during a search for an optimum solution, another optimum solution search state is realized by a state transition. Examples of the state transition condition being considered include the fitness value of the best solution in a group or the number of executed search steps (processes).

Thus, the deterioration of a search efficiency in a particular state causes an immediate state transition for a more efficient search. Such state transitions are repeated until a terminating condition is satisfied. The introduction of a state transition ensures the perpetual continuation of a search for an optimum solution in an efficient way, thereby enabling an optimum solution to be obtained in a short amount of time.

This invention further adopts, the acceptance (recruitment) of new individuals that randomly generates a new solution. It also adopts a hill climbing process and a neighborhood (proximity) search process for upgrading the quality of a solution. The acceptance of new individuals allows for an easy maintenance of the diversity of a group of solution candidates, thereby minimizing the danger of being trapped in a local optimum solution different from the global optimum solutions. As well, a proximity search process and a hill climbing process improve the quality of a solution in a given state, thus they produce a solution having a good objective value in a short amount of time.

BRIEF DESCRIPTION OF THE DRAWINGS

One of skill in the art can easily understand additional features and objects of this invention from the attached drawings. In the drawings:

FIG. 5 is a data set, specifying (X, Y) coordinate values of the city locations plotted in FIG. 4;

FIG. 8 is a table, exemplifying a combination of operations in each state shown in FIG. 7;

FIG. 22 is the first graph, showing a result of a simulation using the genetic algorithm;

FIG. 23 is the second graph, showing the result of a simulation using the genetic algorithm; and FIG. 24 is the third graph, showing the result of a simulation using the genetic algorithm.

DETAILED DESCRIPTION OF EMBODIMENTS

Embodiments of this invention are described below with reference to the attached drawings.

Figure 1:
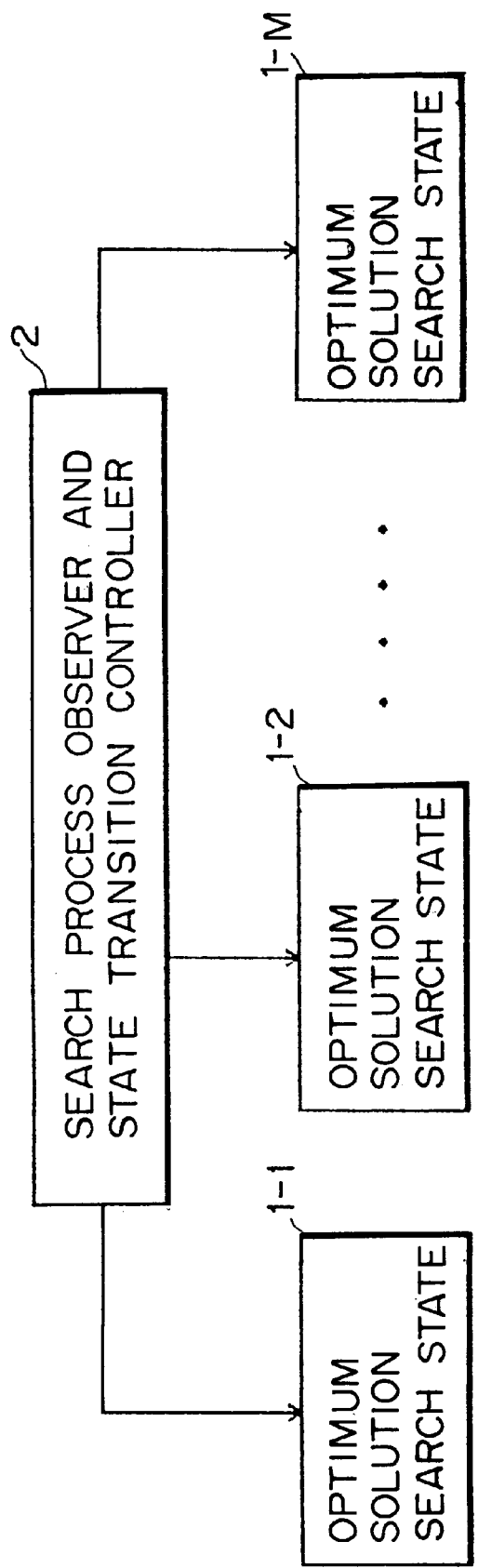
FIG. 1 is a block diagram, showing the underlying principle of a problem solving operation apparatus of this invention.

FIG. 1 is the block diagram, showing the underlying principle of the problem solving operation apparatus of this invention.

More specifically, FIG. 1 illustrates a problem solving operation apparatus for obtaining an optimum solution through a search in a search space for solutions of a problem, with the concept of a state transition introduced, aiming e.g. at solving a mathematical programming problem.

Each of plural optimum solution search states 1-1 through 1-M is realized for searching an optimum solution using a combination of one or more optimum solution search techniques. As described earlier, optimum solution search techniques include search techniques of a genetic algorithm such as a reproduction process, a crossover process and a mutation process, as well as search techniques other than the genetic algorithm.

A search process observer and state transition controller 2 observes the search process in each of the optimum solution search states 1-1 through 1-M. It also causes a state transition from an optimum solution search state to another, when a predetermined condition is satisfied in the optimum solution search state before the state transition.

This invention is premised on a search for optimum solutions in states using combinations of one or more optimum solution search techniques. As described above, an optimum solution search technique uses a combination of some genetic algorithmic techniques and other optimization techniques.

Assuming the problem solving operation apparatus searches optimum solutions in an optimum solution search state 1-i (i is one of 1 through M) representing a search process having a certain combination of optimum solution search techniques, when a predetermined condition is satisfied (e.g. when the growth rate of the fitness value of a solution falls below a threshold value) the search process observer and state transition controller 2 has the problem solving operation apparatus discontinue its search for optimum solutions in this optimum solution search state 1-i and search optimum solutions by using a different set of search parameters in another optimum solution search state representing another search process having another certain combination of optimum solution search techniques.

Thus, this invention causes state transitions in a search for optimum solutions among the optimum solution search states 1-1 through 1-M, each representing a search process combining more than one optimum solution search techniques. This enables one of the optimum solution search states 1-1 through 1-M to continue a search for an optimum solutions, when another one of the optimum solution search states has a lower search efficiency.

Figure 2:
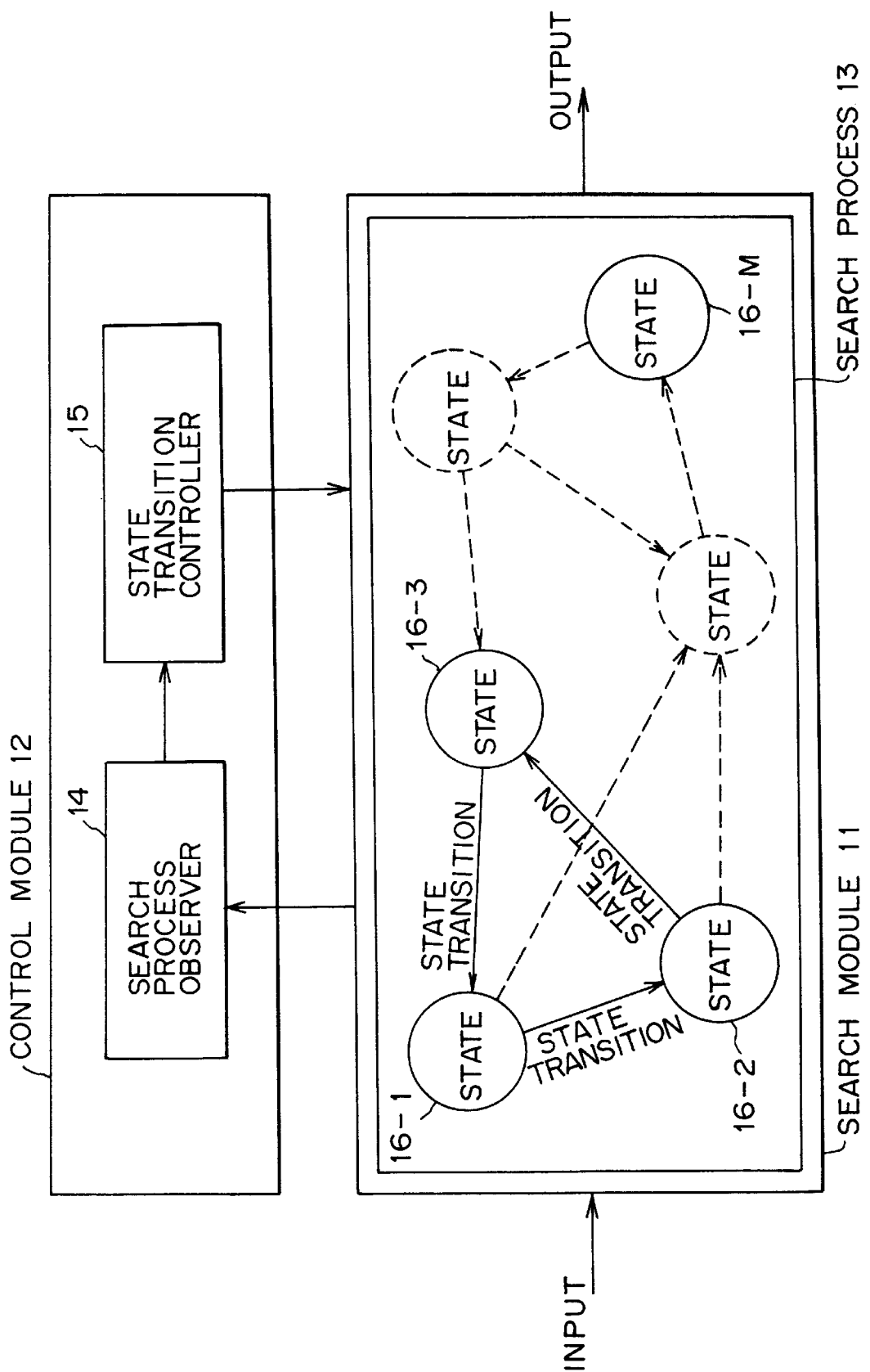
FIG. 2 is a block diagram, showing the basic configuration of a problem solving operation apparatus of this invention.

FIG. 2 is a block diagram, showing the basic configuration of a problem solving operation apparatus of this invention.

A problem solving operation apparatus mainly comprises a search module 11 and a control module 12. The search module 11 comprises a search process 13 which can be in one of a plurality of search states 16-1 through 16-M. The control module 12 comprises a search process observer 14 and a state transition controller 15.

The search module 11 outputs an optimum solution in response to the input of a problem. The plurality of search states 16-1 through 16-M shown in the search process 13 correspond respectively to optimum solution search states 1-1 through 1-M shown in FIG. 1, each representing a state of the search process 13 having a combination of more than one optimum solution search techniques. Some of such optimum solution search techniques may be search techniques other than genetic algorithmic techniques.

The control module 12 observes an optimum solution search process of the search module 11, and conducts state transitions among the search states 16-1 through 16-N in a search for optimum solutions, based on the observation result. The search process observer 14 has a function of observing the growth rate of the objective values (or fitness values) of searched solutions, (i.e. the rate of change of objective values against the change in the number of generations,) a distribution of objective values of individuals in a group belonging to a single generation, the number of repetitions of search process performances or other evaluation standards for a genetic algorithm.

When the search process observer 14 determines that the current state has a lower efficiency, the state transition controller 15 causes a state transition of a search process e.g. by conducing a transition from the one to another among the search states 16-1 through 16-M.

The following is a more specific description about the operation of each module shown in FIG. 2:

The search module 11 outputs an outline (e.g. the distribution and the best of the objective values) of the group representing each generation during operations using a genetic algorithm.

The search process observer 14 in the control module 12 observes an output from the search module 11, compares the observation result with a predetermined state transition condition, and outputs to the state transition controller 15 an instruction for effecting a state transition pursuant to its comparison result. Upon receiving the instruction, the state transition controller 15 causes the search module 11 to continue the search for optimum solutions by changing the search state. This operation continues until a terminating condition for the search is satisfied.

Figure 3:
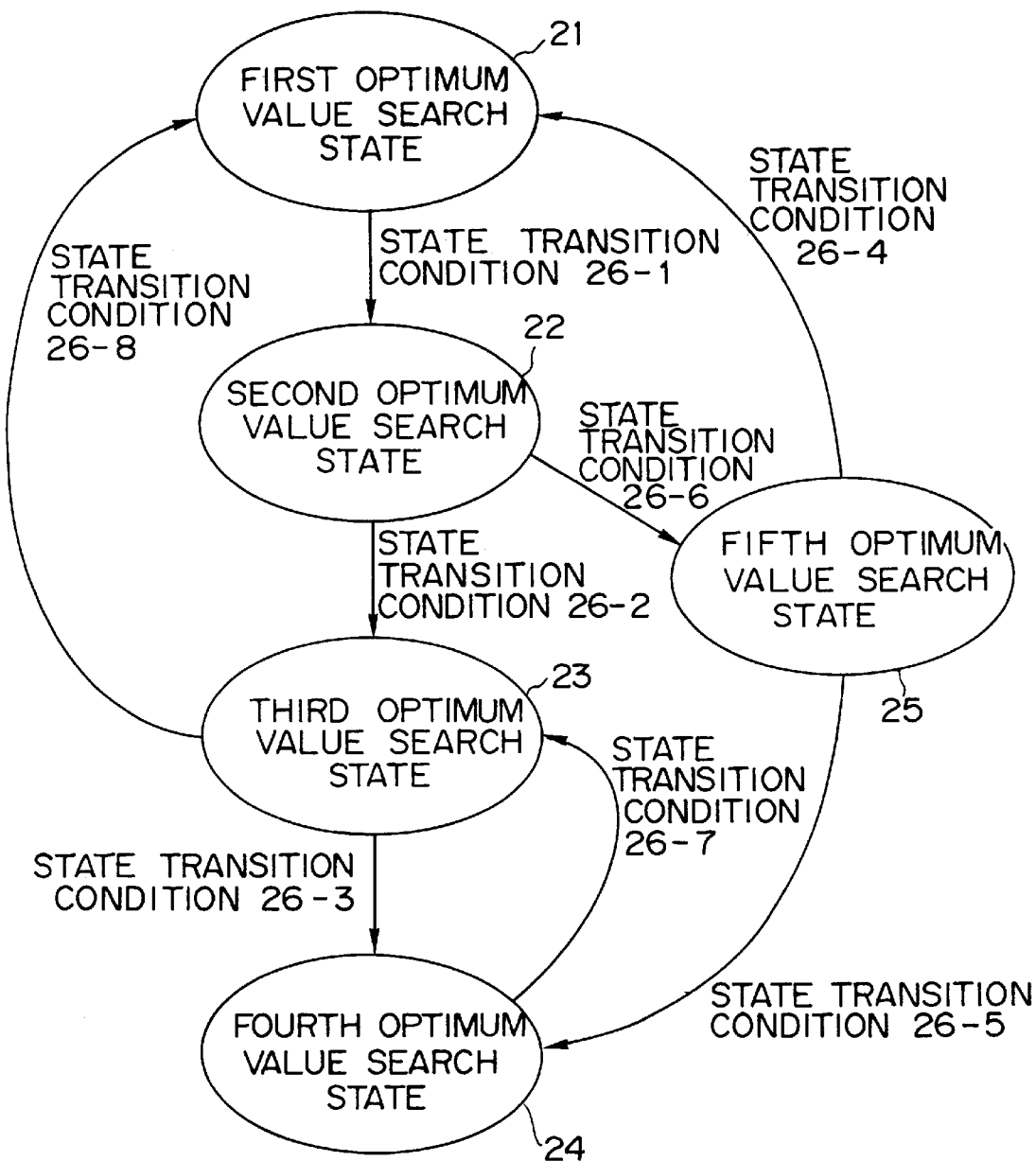
FIG. 3 is an explanatory diagram, illustrating a state transition.

FIG. 3 is an explanatory diagram, illustrating a state transition in an search module.

A first optimum value search state 21, a second optimum value search state 22, a third optimum value search state 23, a fourth optimum value search state 24 and a fifth optimum value search state 25, are search states used for searching an optimum value (or optimum values) for a given problem. More specifically, each of the five optimum value search states 21 through 25 corresponds to a state of a search process searching an optimum value. Each of these states represents the search process generally combining a plurality of optimum value search techniques.

Eight state transition conditions 26-1 through 26-8 are conditions triggering state transitions among the five optimum value search states 21 through 25 corresponding to the efficiencies of improvements in the search. This example assumes the eight state transition conditions 26-1 through 26-8 to operate as follows:

A first state transition condition 26-1 triggers a state transition from the first optimum value search state 21 to the second optimum value search state 22.

A second state transition condition 26-2 triggers a state transition from the second optimum value search state 22 to the third optimum value state 23.

A third state transition condition 26-3 triggers a state transition from the third optimum value search state 23 to the fourth optimum value search state 24.

A fourth state transition condition 26-4 triggers a state transition from the fifth optimum value search state 25 to the first optimum value search state 21.

A fifth state transition condition 26-5 triggers a state transition from the fifth optimum value search state 25 to the fourth optimum value search state 24.

A sixth state transition condition 26-6 triggers a state transition from the second optimum value search state 22 to the fifth optimum value search state 25.

A seventh state transition condition 26-7 triggers a state transition from the fourth optimum value search state 24 to the third optimum value search state 23.

An eighth state transition condition 26-8 triggers a state transition from the third optimum value search state 23 to the first optimum value search state 21.

Figure 4:
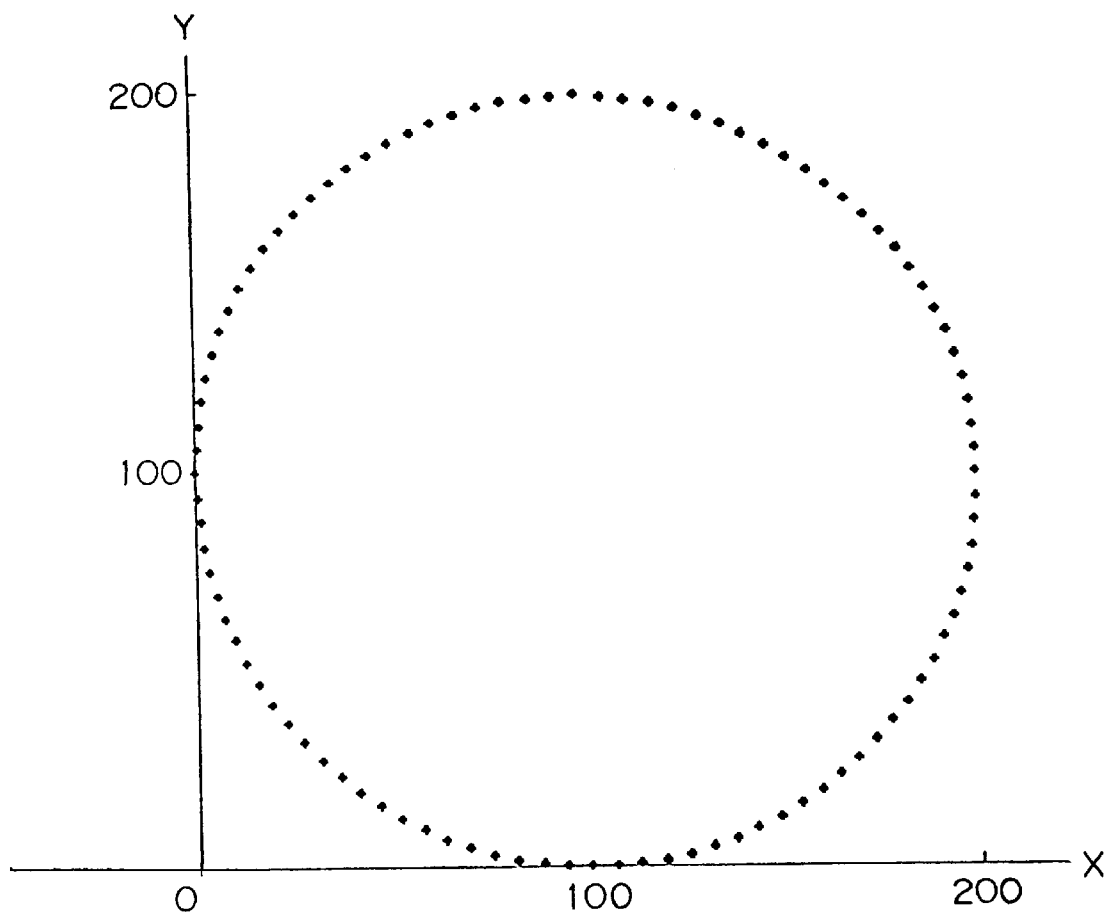
FIG. 4 is a plot, exemplifying city locations for use in a traveling salesman problem.

FIG. 4 is a plot, exemplifying city locations for use in a traveling salesman (or salesperson) problem.

FIG. 5 is a data set, specifying (X, Y) coordinate values of the city locations plotted in FIG. 4.

An embodiment of this invention is explained below by using as a concrete example a traveling salesman problem that requires a solution of traveling to the exemplified one hundred [100] cities in the shortest distance without any second visit.

A technique of solving a traveling salesman problem using a genetic algorithm codes as chromosomes traveling paths that are solution candidates. This embodiment adopts a coding method, which codes city numbers (corresponding city names respectively) as genes and the sequence of the numbers of the cities which a salesman travels as a chromosome.

Figure 6:
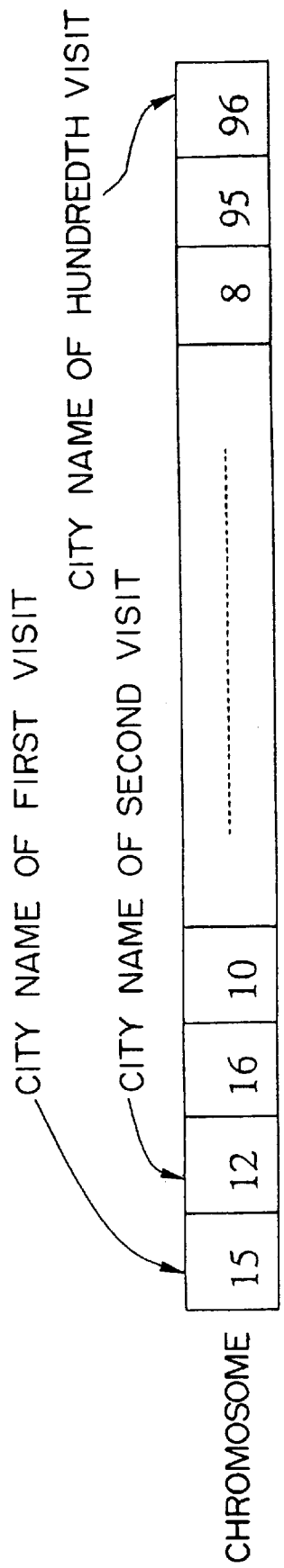
FIG. 6 is a map, exemplifying coding of a solution candidate.

FIG. 6 is a map, exemplifying coding of a solution candidate.

City names of cities visited first through hundredth are coded using their city numbers, and the sequence of the numbers (a solution candidate) is represented as a chromosome. A traveling salesman problem is defined as a problem for minimizing a cost of a solution, which corresponds to a sum of distances of traveling paths among cities.

The following equation exemplifies a fitness function f(x), which is an objective function in this problem, for a solution x (chromosome).

$$f(x) = K - \sum_{i=1}^{n} d_i(x) \qquad (1)$$

where $d_i(x)$ represents the distance between the (i−1)-th city and the i-th city in the solution x, with $d_1(x)$ denoting the distance between a departure point and the first city, and with $d_n(x)$ denoting the distance between the (n−1)-th city (the city second to the last) and the n-th city (the last city, and at the same time the departure point); n represents the number of the cities, which is one hundred in the example shown in FIG. 4; and a bias K represents a product defined as the number of the cities multiplied by the diameter of a circle (the longest distance of all the distances between the cities) obtained by connecting neighboring cities shown in FIG. 4.

$$\sum_{i=1}^{N} d_i(x)$$

in the right hand side of equation (1) represents the cost of the solution x. The smaller this cost is, the larger the value of the fitness function f(x) is.

Figure 7:
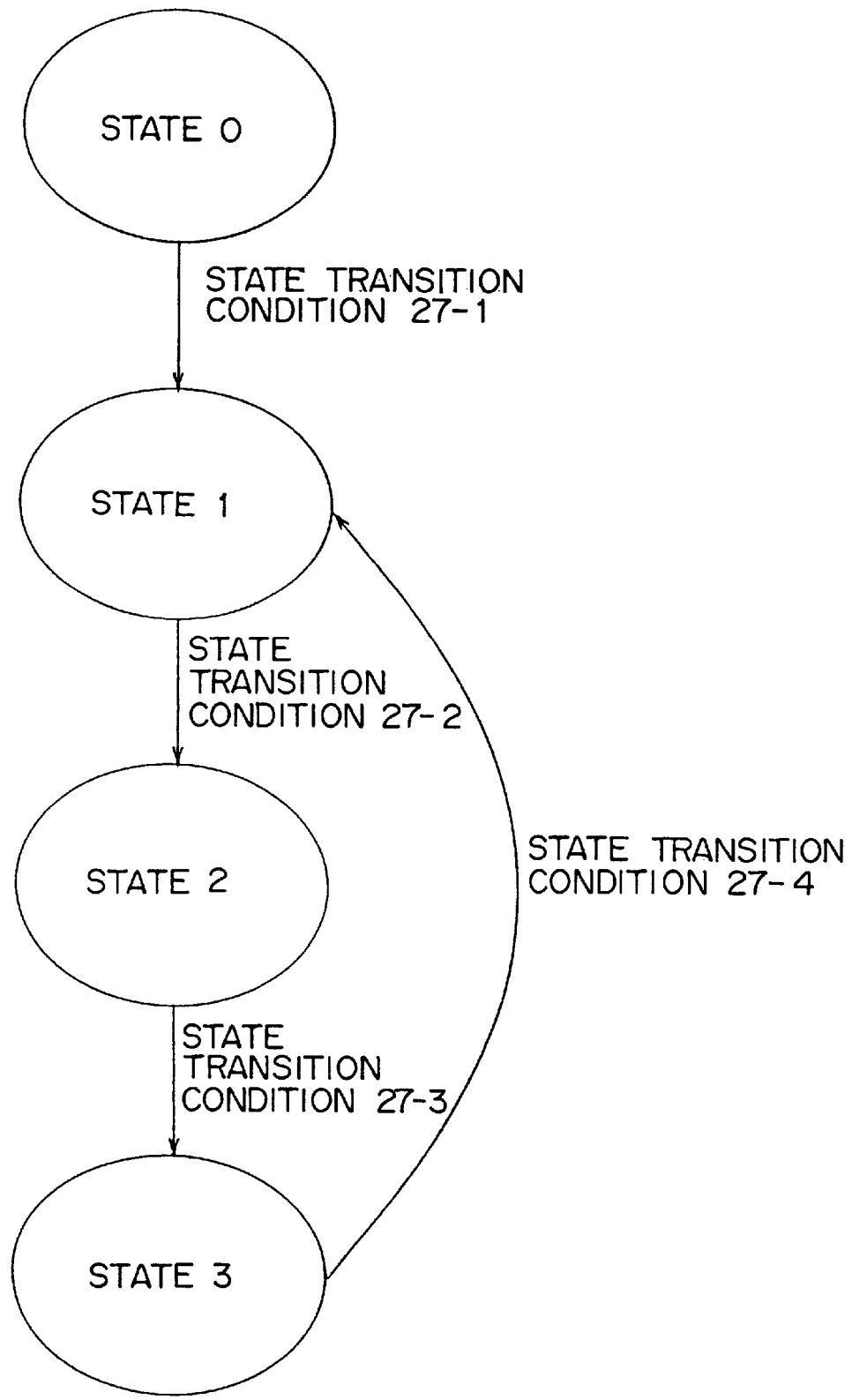
FIG. 7 is an explanatory diagram, illustrating a state transition in an embodiment of this invention.

FIG. 7 is an explanatory diagram, illustrating a state transition in an embodiment of this invention.

The optimum solution search process of this embodiment involves the performances of state transitions among four states comprising the state 0, the state 1, the state 2 and the state 3, on the state transition conditions 27-1, 27-2, 27-3 and 27-4.

FIG. 8 is a table, exemplifying a combination of genetic algorithmic operations in each state shown in FIG. 7.

In the state 0, a set of three types of operations comprising a carryover of excellent individuals from the preceding generation (in the case of the first generation, the excellent individuals are taken out of the initial population which is an initial group of individuals), a reproduction process and a crossover process are used to search for an optimum solution as an initial process.

In the state 1, a set of four types of operations further comprising a mutation process, in addition to the above three in the state 0 (i.e. the carryover of excellent individuals from the preceding generation, the reproduction process and the crossover process,) are used to search an optimum solution.

Although this embodiment assumes the search process have the same parameter for the same operation in the state 0 and the state 1, e.g. the parameter for the carryover of excellent individuals from the preceding generation, i.e. the ratio of the excellent individuals carried forward to the succeeding generation is constant, it is quite possible to change the parameter between the state 0 and the state 1. The state 1 is the state in which an ordinary genetic algorithmic process is performed.

In the state 2, a set of five types of operations further comprising a proximity search process, in addition to the above four in the state 1 (i.e. the carryover process of carrying over excellent individuals from a group belonging to the preceding generation, the reproduction process, the crossover process and the mutation process, ) are used to search an optimum solution. The state 2 emphasizes the proximity search process, which is defined as repetition of an operation similar to the mutation process in each of some individuals with higher fitness values selected from their group belonging to the same single generation, starting from the one having the highest fitness value. In the proximity search process, a chromosome pattern is changed actually only when the fitness value is improved. Major parameters for the proximity search process have the following values:

The number of times of the repetition of the operation in an individual of a group belonging to the same single generation is more than or equal to one. The range of the proximity search process, i.e. the ratio of the number of individuals to which a proximity search process is performed against the number of the individuals in the group, is not less than 0.0 and not more than 1.0.

Figure 9:
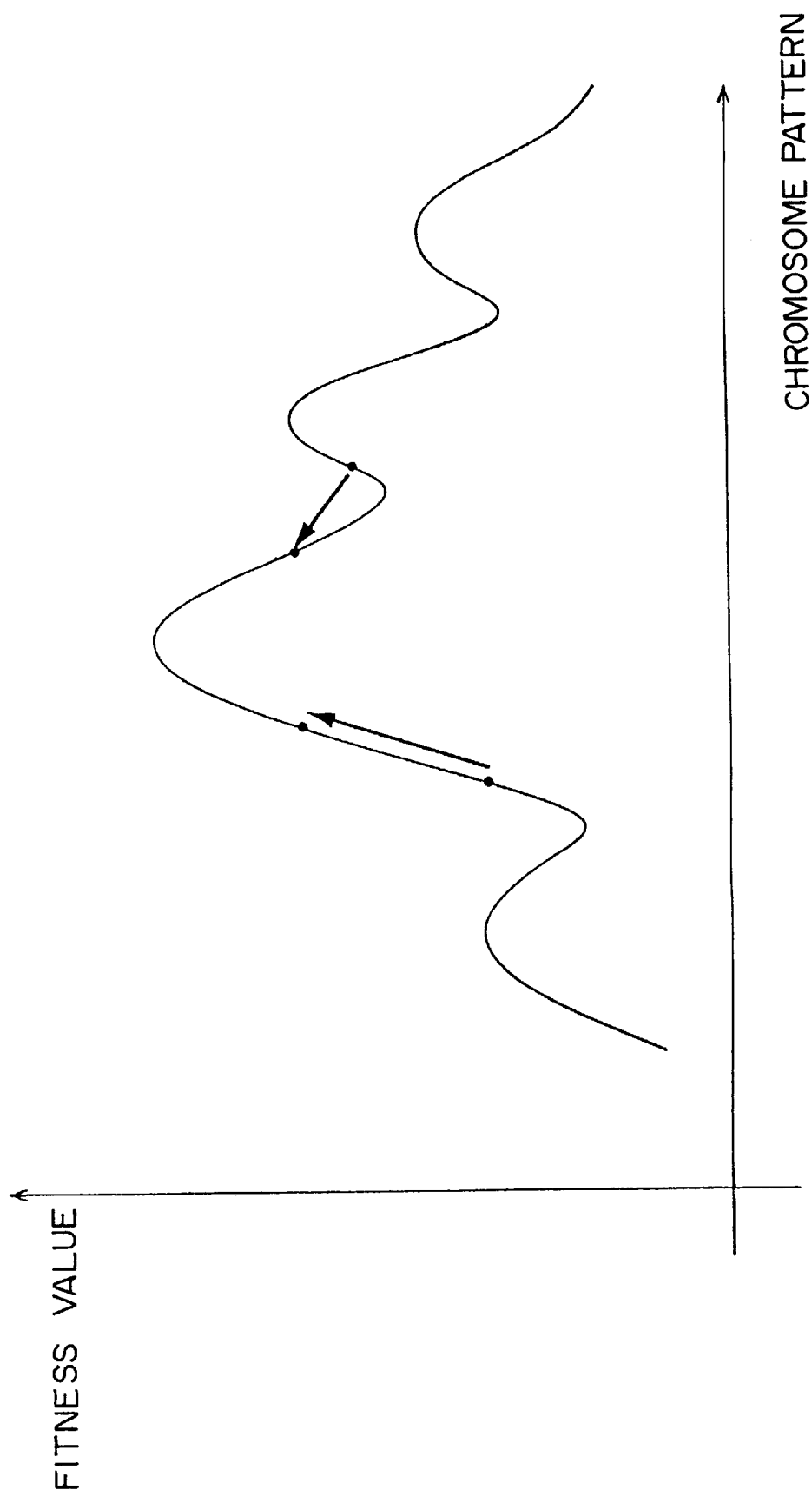
FIG. 9 is a conceptual view, illustrating an image of the proximity search process.

FIG. 9 is a conceptual view, illustrating an image of the proximity search process.

This shows that changes in a chromosome pattern allows a search for a solution (chromosome) having a higher fitness value.

In the state 3, a set of two types of operations comprising the carryover of excellent individuals from the preceding generation and an acceptance (recruitment) of new individuals are used to search an optimum solution. The ratio of the number of new individuals against the number of all the individuals of the group is not less than 0.0 and not more than 1.0.

Figure 10:
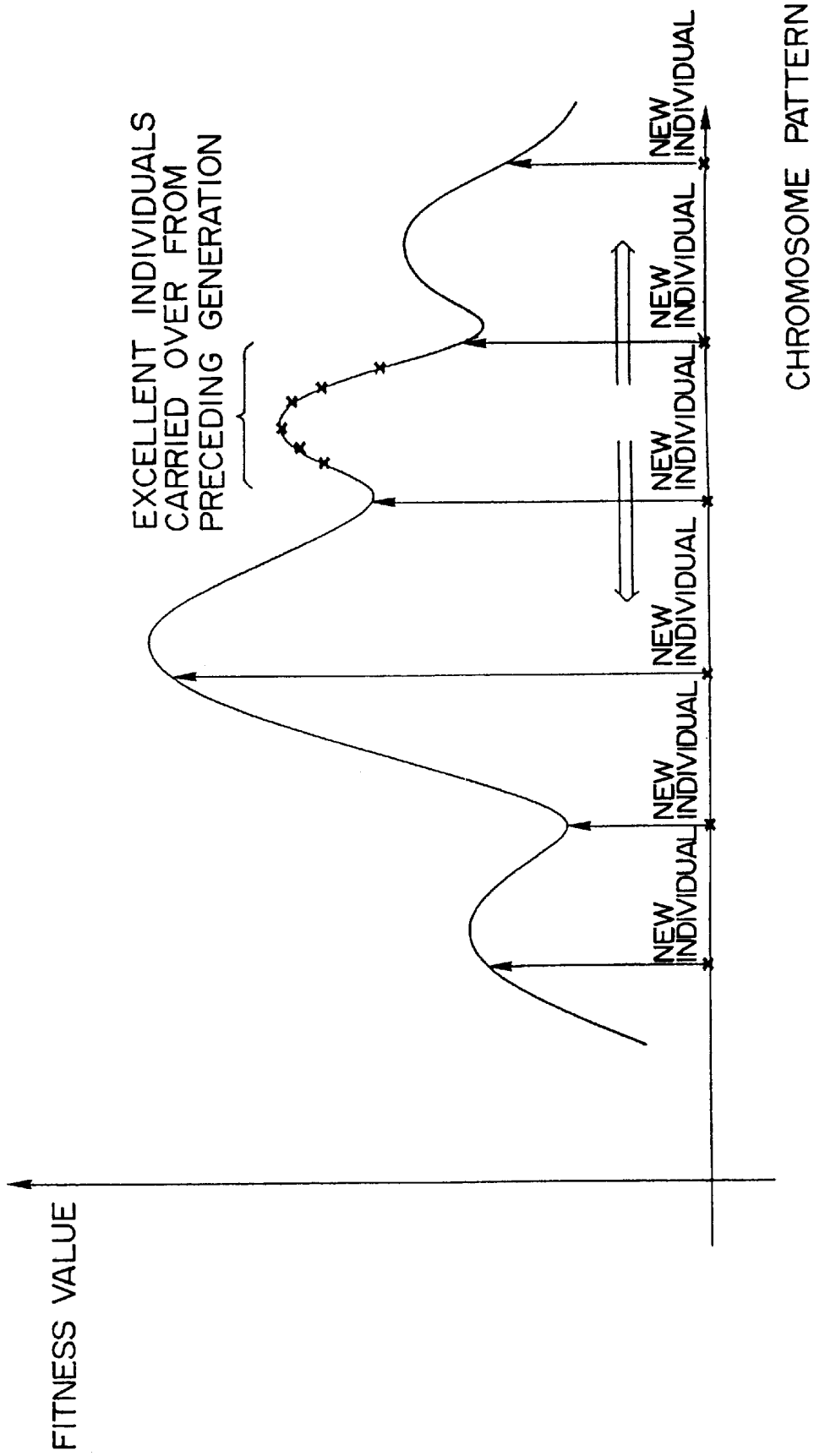
FIG. 10 is a conceptual view, illustrating an image of accepting new individuals (recruits)

FIG. 10 is a conceptual view, illustrating the image of the acceptance (recruiting) of new individuals.

Because new individuals are randomly generated, their chromosome patterns are spread in a broad range.

Returning to FIG. 8, explained below is some parameters commonly set for respective operations in the state 0, the state 1, the state 2 and the state 3. The total number of chromosomes of a group belonging to a single generation, i.e. the size of the population, which is the total number of individuals, is set to ten. The value of a generation overlap (the opposite concept of "generation gap") ratio, which is defined as the ratio of individuals carried over from the preceding generation to the present generation, is 0.4. That is, the top 40 percent of a group of individuals are carried over to the succeeding generation. The probability of the mutation is 0.01. That is, a change of (a pair of) gene values in a chromosome (e.g. a change of a pair of city numbers at particular positions in a string of genes as one shown in FIG. 6) is performed at the rate of 1 percent per one position.

Returning to FIG. 7, the state transition conditions 27-1 through 27-3 among the states 0 through 3 are represented with combinations of the following three conditions. The first condition (condition A) is that the sum of the standard deviations of the respective genes in the ten chromosomes is lower than a predetermined threshold value.

Figure 11:
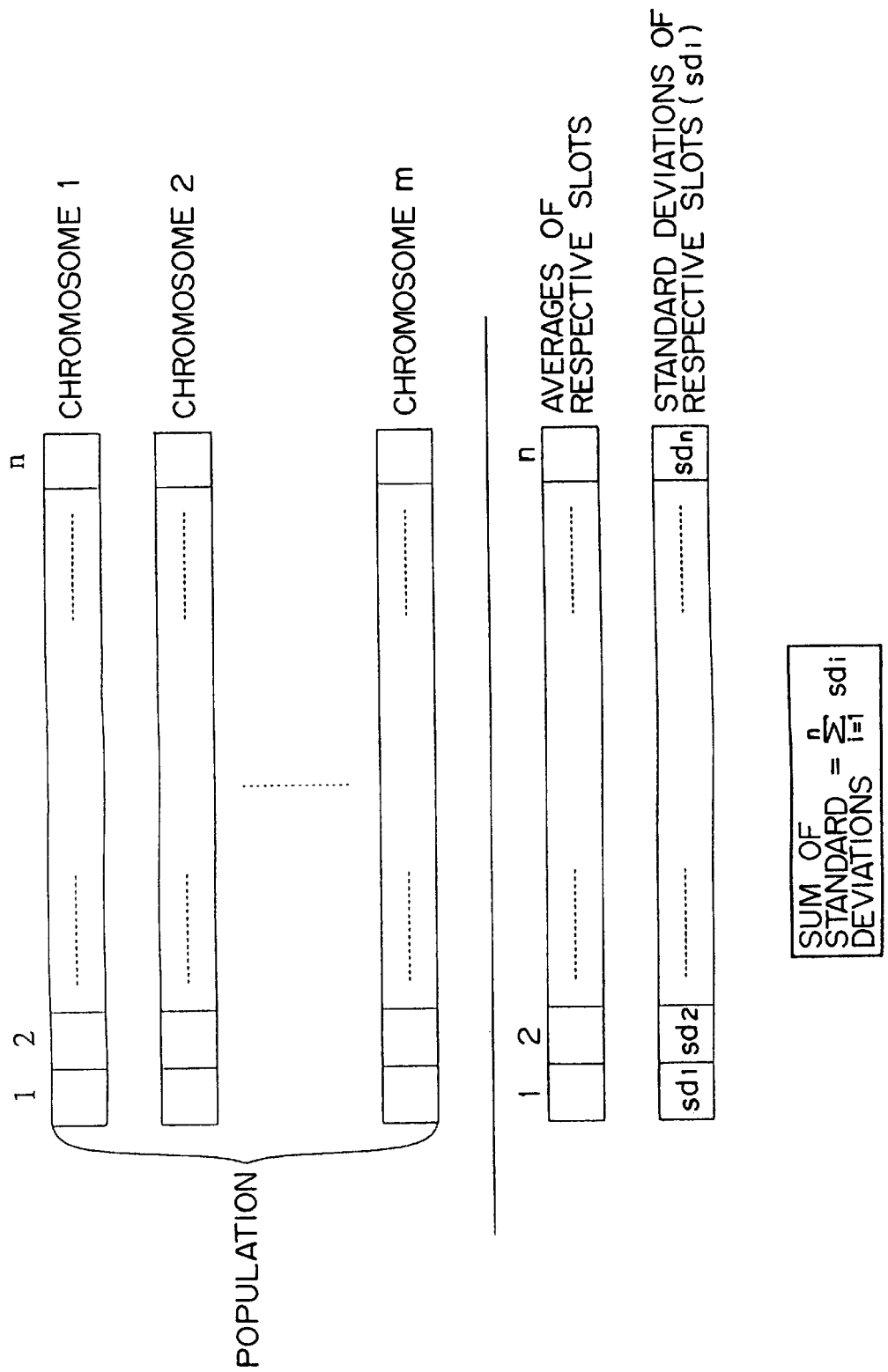
FIG. 11 is an explanatory diagram, illustrating the sum of standard deviations in condition A.

FIG. 11 is an explanatory diagram, illustrating the sum of the standard deviations in the condition A.

An average and a standard deviation of the values of the respective genes (the number of the cities) in m chromosomes is obtained for each of n slots. The sum of the standard deviations is obtained from the standard deviations for respective slots. When the sum is lower than the predetermined threshold value, it is determined that the condition A is satisfied. That is, the condition A means that the diversity of the chromosomes in an n dimensional space becomes lower, when the sum of the standard deviations of the n genes (numbers of the cities) is less than a predetermined threshold value, where each chromosome is regarded as a point in the n dimensional space.

The second condition (condition B) is that the number of the repetitions of search process performances exceeds a predetermined threshold value.

The third condition (condition C) is that the growth rate of the maximum fitness value of a series of generations falls below a predetermined threshold value. This is determined by obtaining the rate of the change of the maximum fitness value. The fitness values for each generation are calculated by substituting the value $d_i(x)$ of a chromosome as a solution candidate for that in the fitness value function $f(x)$.

Figure 12:
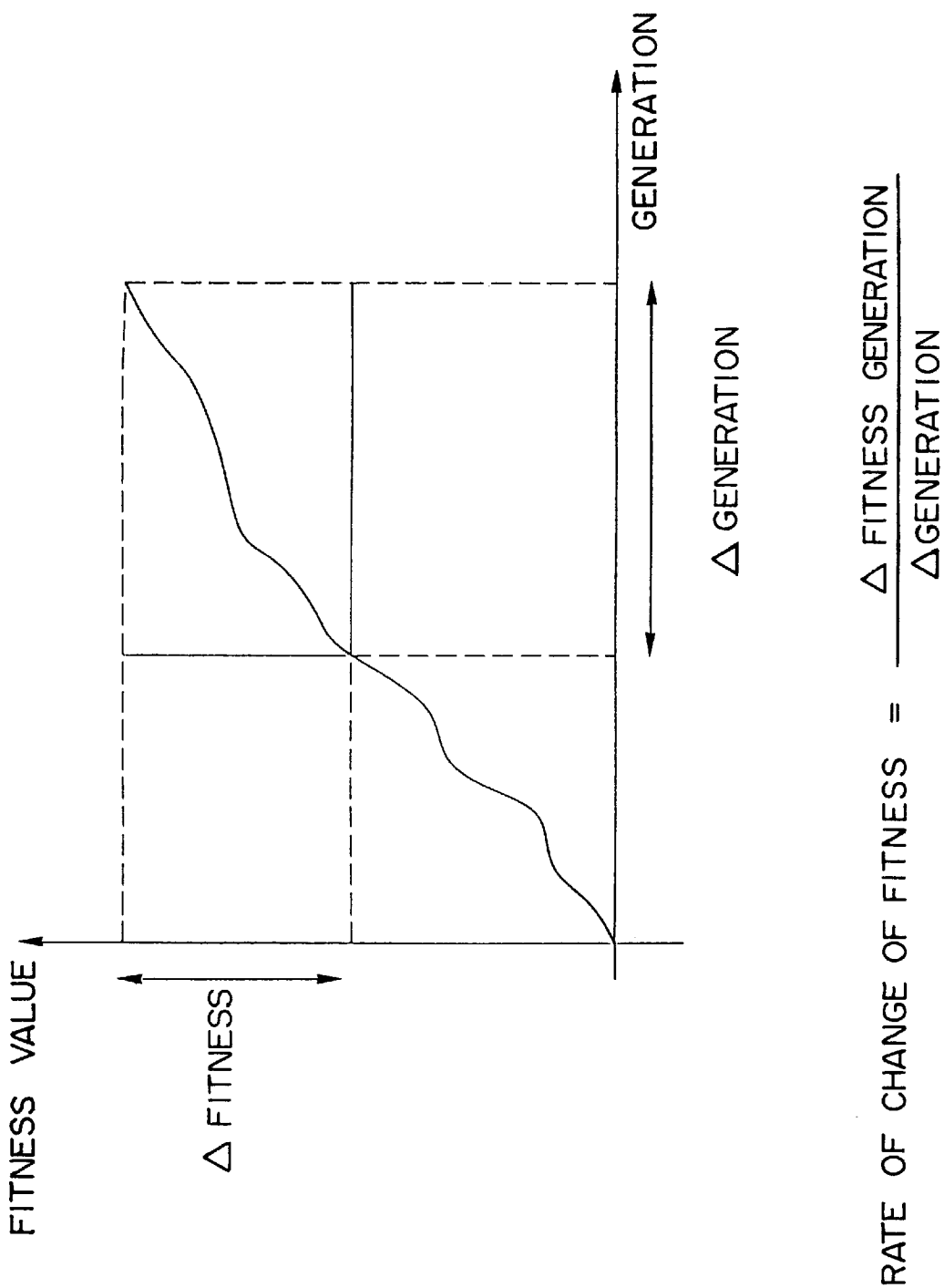
FIG. 12 is an explanatory diagram, illustrating the rate of change of fitness values in condition C.

FIG. 12 is an explanatory diagram, illustrating the rate of the change of the maximum fitness value in the condition C. The maximum (highest) fitness value of ones of the plural individuals belonging to each generation is plotted in FIG. 12.

The rate of the change of the maximum fitness value is calculated according to the following equation.

$$\text{Rate of Change} = \frac{\Delta \text{fitness}}{\Delta \text{generation}} \qquad (2)$$

Performing the carryover process, the maximum fitness value of a generation is kept to be equal to or larger than the one of a preceding generation since an individual with the maximum fitness value is always carried over from the preceding generation.

In equation (2), $\Delta$generation represents a difference between two generation numbers and $\Delta$fitness represents a difference between two fitness values corresponding to the generation numbers.

Returning to FIG. 7, a problem solving operation apparatus of this embodiment searches an optimum solution in the state 0 as the initial process, and, upon satisfaction of the state transition condition 27-1, searches an optimum solution in the state 1 as the secondary process. Thereafter, it repeats a loop of the state transitions the state 1→the state 2→the state 3→the state 1 → . . . e.g. until a maximum execution time lapses.

This embodiment assumes that the state transition conditions 27-1, 27-2 and 27-3 are all the same, and that a state transition is performed when $$\text{condition A} \cup (\text{condition B} \cap \text{condition C}) \quad (3)$$

is in effect.

That is, this embodiment assumes that the state transitions from the state 0 to the state 1, from the state 1 to the state 2, and from the state 2 to the state 3 are performed, either when both the condition B and condition C are in effect or when condition A is in effect.

Here, parameters like a threshold value used in one of the state transition conditions can differ from those used in another one.

Figure 13:
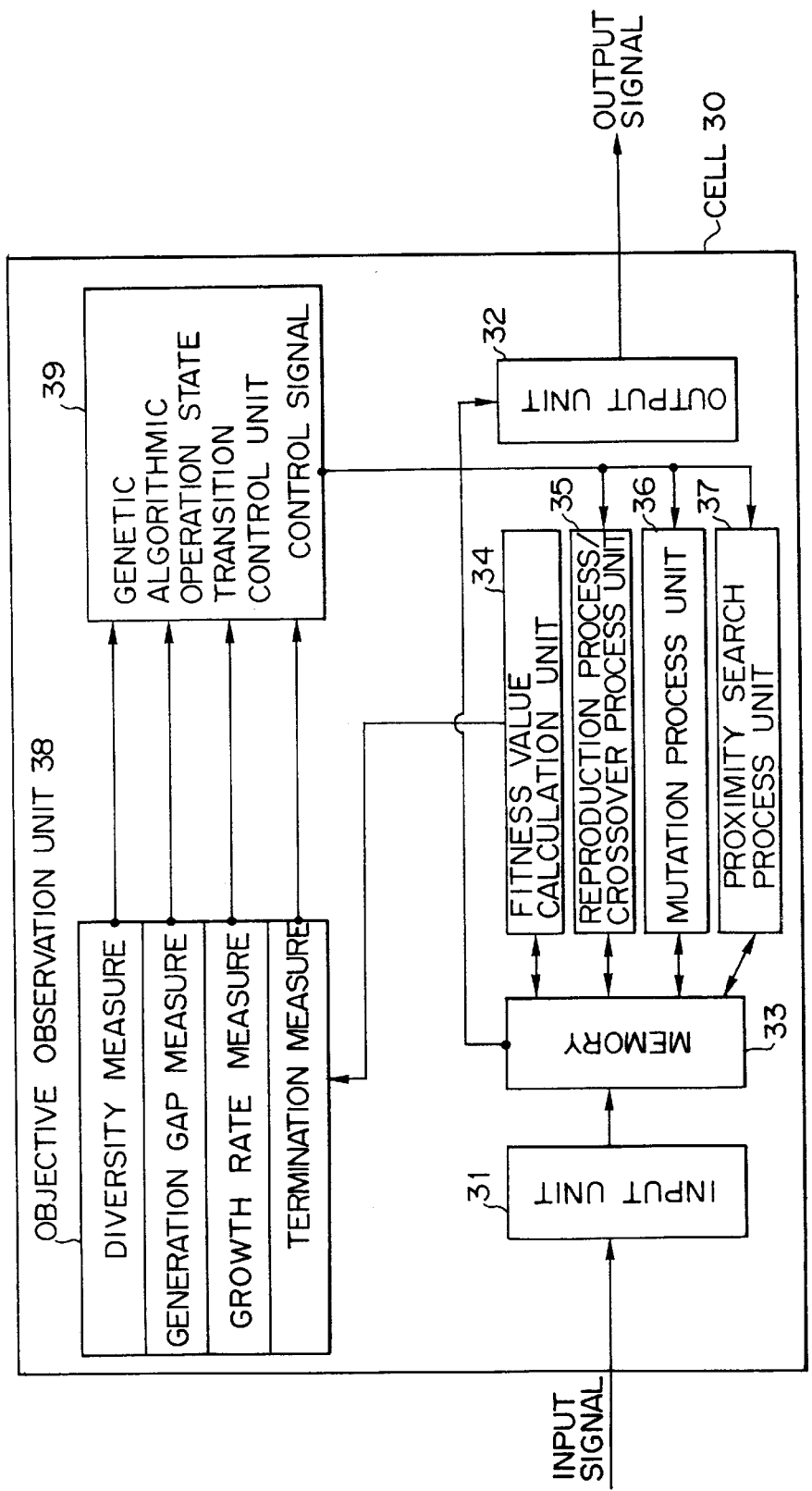
FIG. 13 is a block diagram, showing detailed configuration of the problem solving operation apparatus of this invention with a genetic algorithm applied.

FIG. 13 is a block diagram, showing the detailed configuration of the problem solving operation apparatus of this invention shown in FIG. 2 with a genetic algorithm applied.

The cell 30 comprises an input unit 31 for receiving an input signal, an output unit 32 for supplying an output solution, a memory 33 for storing solution candidates in a search process and input data, a fitness value calculation unit 34 for calculating a fitness value of the solution, a reproduction process/crossover process unit 35 for performing a crossover process and a reproduction process in a genetic algorithm, a mutation process unit 36 for performing a mutation process, and a proximity search process unit 37 for performing a proximity search process.

The cell 30 can be set in any of the search states 16-1 through 16-M by selecting a combination of operations by units 34 through 37.

An objective observation unit 38 corresponds to the search process observer 14 shown in FIG. 2. A genetic algorithmic operation state transition control unit 39 corresponds to the state transition controller 15 shown in FIG. 2. Based on a diversity measure, which defines a predetermined threshold value for the sum of standard deviations, a generation gap measure, which defines the ratio of a generation gap which is a ratio of the number of the individuals to be carried over to the number of the individuals belonging to the population, a growth rate measure, which defines a predetermined threshold value for the growth rate of fitness value, and a termination measure, which defines the maximum number of operations, the objective observation unit 38 issues necessary instructions to the genetic algorithmic operation state transition control unit 39. For instance, the ratio of a generation gap defined by the generation gap measure is a parameter in performing a genetic algorithmic operation of carrying over an excellent individual from the preceding generation.

Preparing plural cells and having them search optimum solutions independently in parallel, the search efficiency can be further improved.

Figure 14:
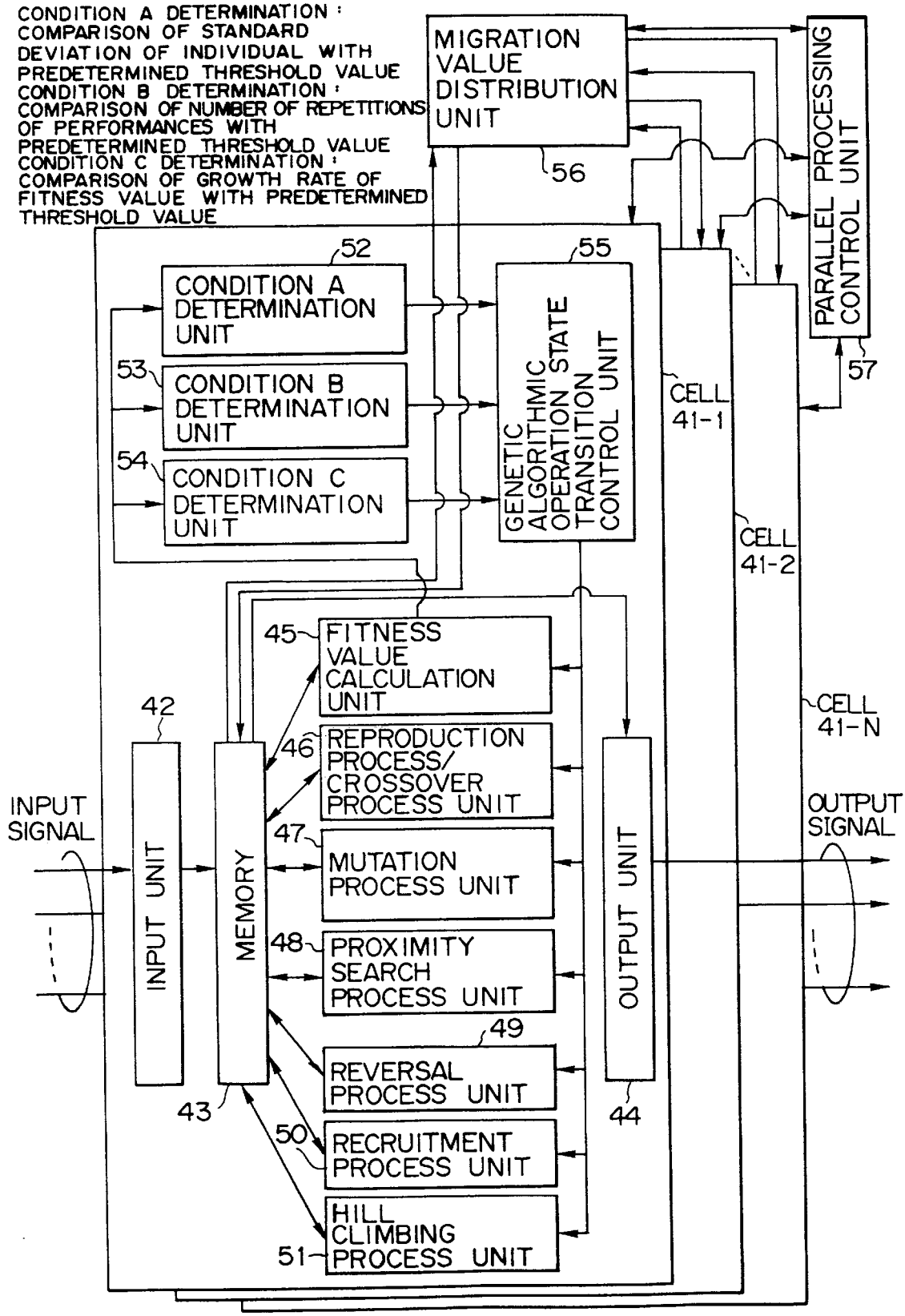
FIG. 14 is a block diagram, showing the configuration of a problem solving operation apparatus with parallel processing using a hill climbing process.

FIG. 14 is a block diagram, showing the configuration of a problem solving operation apparatus using plural cells connected in parallel, each cell including a hill climbing process unit.

A plurality of cells 41-1 through 41-N connected to a migration value distribution unit 56 and a parallel processing control unit 57 operate in parallel, which further improves the growth speed of the solutions.

A cell 41-i comprises a condition A determination unit 52, a condition B determination unit 53, a condition C determination unit 54, a genetic algorithmic operation state transition control unit 55, an input unit 42, an output unit 44, a memory 43, an fitness value calculation unit 45, a reproduction process/crossover process unit 46, a mutation process unit 47, a proximity search process unit 48, a reversal process unit 49, a recruitment process unit 50 and a hill climbing process unit 51. Functions of the input unit 42, the output unit 44, the memory 43, the fitness value calculation unit 45, reproduction process/crossover process unit 46, mutation process unit 47 and proximity search process unit 48 are basically equivalent respectively to the input unit 31, the output unit 32, the memory 33, the fitness value calculation unit 34, the reproduction process/crossover process unit 35, the mutation process unit 36 and the proximity search process unit 37 shown in FIG. 13.

The reversal process unit 49 performs an inversion process which reverses a sequence of genes in a part of a chromosome. The recruitment process unit 50 accepts new individuals. The hill climbing unit 51 performs a search by a hill climbing method similar to a proximity search method.

The fitness value calculation unit 45 calculates the sum of standard deviations, the number of times of operations performed in each generation and the growth rate of fitness value and sends the calculated results to the condition A determination unit 52, the condition B determination unit 53 and the condition C determination unit 54.

Upon receiving the calculated results from the fitness value calculation unit 45, the condition A determination unit 52, the condition B determination unit 53 and the condition C determination unit 54 respectively determine, by comparing them with predetermined threshold values, whether or not the condition A, the condition B and the condition C are satisfied, and notify genetic algorithmic operation state transition control unit 55 of their determinations.

The genetic algorithmic operation state transition control unit 55 determines whether or not the state transition conditions 27-1 through 27-4 shown in FIG. 7 are satisfied, sets the state transition flag value s indicating the result, and accordingly controls fitness value calculation unit 45, the reproduction process/crossover process unit 46, the mutation process unit 47, the proximity search process unit 48, the reversal process unit 49, the recruitment process unit 50 and the hill climbing process unit 51.

The migration value distribution unit 56 collects a pattern of chromosomes having the highest fitness values from each of the plurality of the memories 43-1 through 43-N respectively of the plurality of the cells 41-1 through 41-N, and distributes the pattern of chromosomes having the highest fitness values amongst the collected patterns to the plurality of cells 41-1 through 41-N.

The parallel processing control unit 57 has the cells 41-1 through 41-N synchronize starting and stopping their operations, thereby conducts parallel processing by the cells and controls it. The parallel processing control unit 57 also controls the migration value distribution unit 56.

Figure 15A:
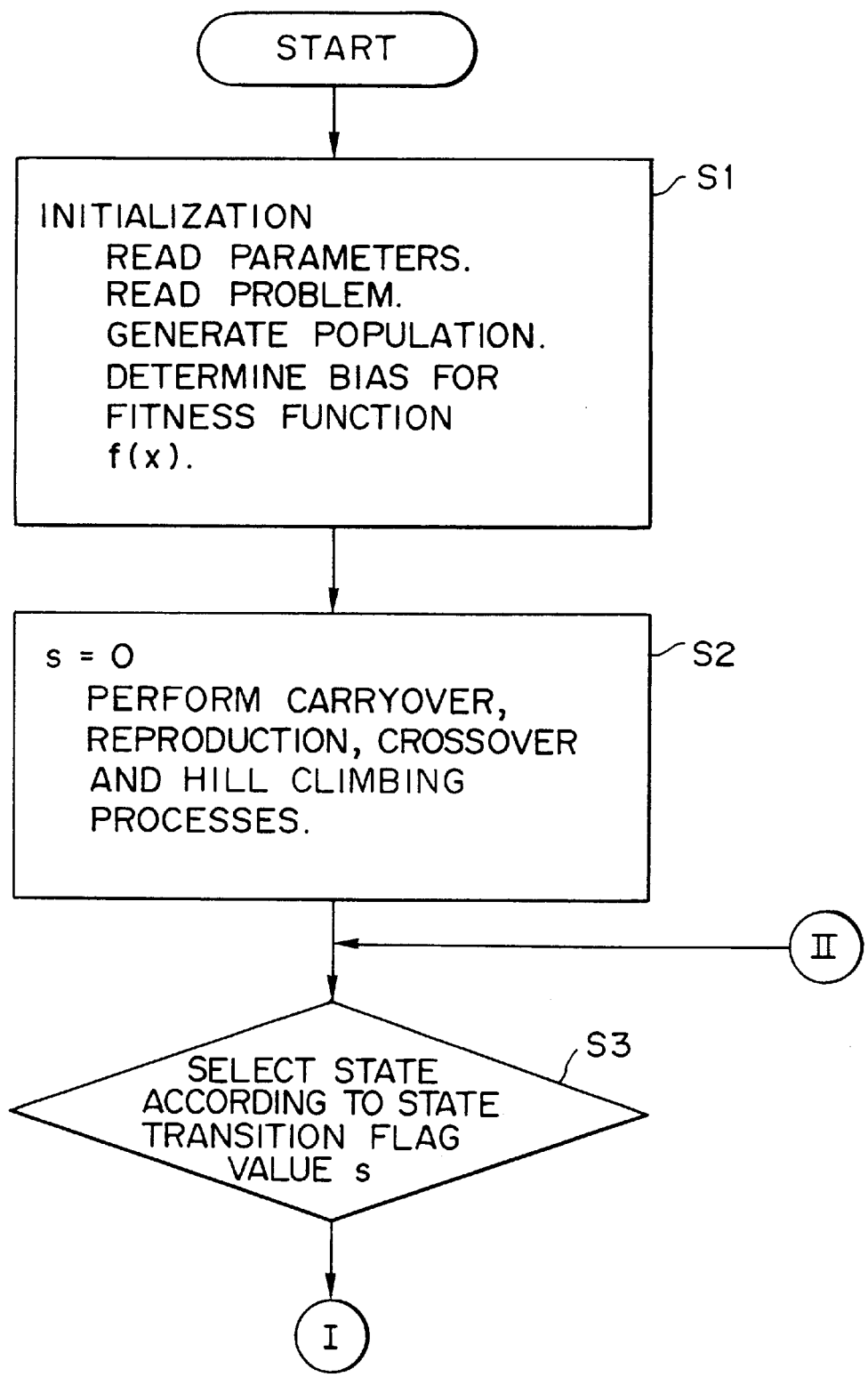
FIG. 15A is a first part of flowcharts, showing in a two-part series the processes of a problem solving operation apparatus.

FIG. 15A is the first part of the flowcharts, showing in a two-part series the processes of a problem solving operation apparatus, which is shown in FIG. 14.

Step S1:

Upon starting its routine, initialization is performed in each cell 41-i, which is corresponding to one of the plurality of cells 41-1 through 41-N. The initialization enables the cell 41-i to read a problem and parameters from its input unit 42 and causes the memory 43 to generate an initial group (an initial population) and to determine a bias K of the fitness function f(x) in accordance with the problem read.

Then, the problem solving operation apparatus continues its routine in step S2.

Step S2:

Genetic algorithmic operation state transition control unit 55 sets the state transition flag value s to 0, and generates a control signal for performing a search process in state 0. This enables the reproduction process/crossover process unit 46 to perform a carryover, a reproduction process, and a crossover process, and the hill climbing process unit 51 to perform a search process.

Upon determining the satisfaction of the state transition condition to state 1 as represented by expression (3), the genetic algorithmic operation state transition control unit 55 sets the state transition flag value s to 1, and generates a control signal for performing a search process in state 1.

Then, the problem solving operation apparatus continues its routine in step S3.

Step S3:

The genetic algorithmic operation state transition control unit 55 generates an appropriate control signal for performing a search process, commensurate with the state transition flag value s set currently.

Figure 15B:
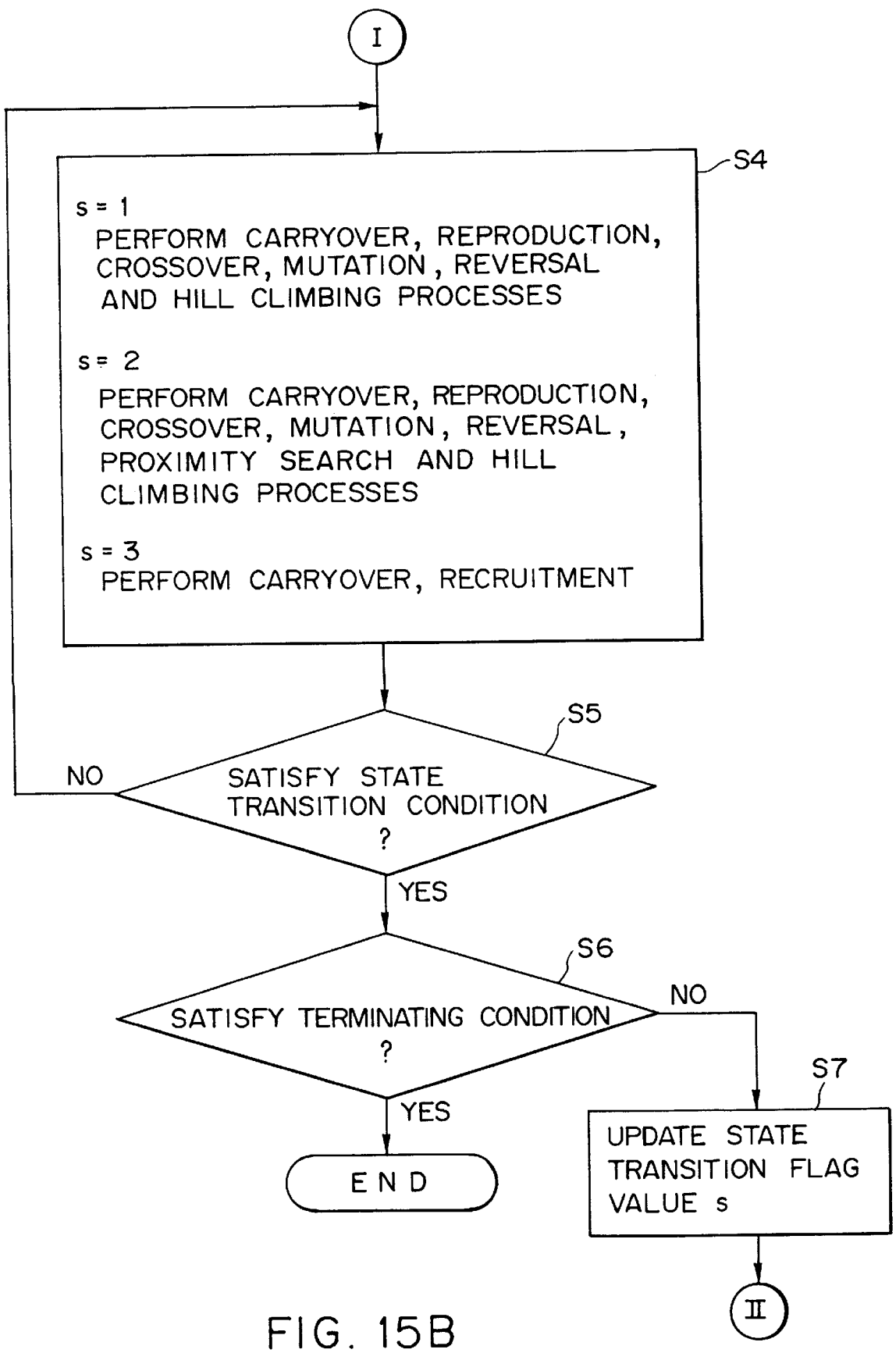
FIG. 15B is a second part of flowcharts, showing in a two-part series the processes of a problem solving operation apparatus.

Then, the problem solving operation apparatus continues its routine in step S4 shown in FIG. 15B.

FIG. 15B is a second part of the flowcharts, showing in a two-part series the processes of the problem solving operation apparatus, which is shown in FIG. 14.

Step S4:

According to a state indicated by the state transition flag value s, the genetic algorithmic operation state transition control unit 55 has the fitness value calculation unit 45, the reproduction process/crossover process unit 46, the mutation process unit 47, the proximity search process unit 48, the reversal process unit 49, the recruitment process unit 50 and the hill climbing process unit 51 perform their respective operations.

When s=1, which indicates state 1, the genetic algorithmic operation state transition control unit 55 has the reproduction process/crossover process unit 46 perform a carryover process, reproduction process and crossover process, the mutation process unit 47 perform a mutation process, the reversal process unit 49 perform a reversal process, and the hill climbing process unit 51 perform a search operation.

When s=2, which indicates state 2, the genetic algorithmic operation state transition control unit 55 has reproduction process/crossover process unit 46 perform a carryover process, reproduction process and crossover process, the mutation process unit 47 perform a mutation process, the proximity search process unit 48 perform a proximity search process, the reversal process unit 49 perform a reversal process, and the hill climbing process unit 51 perform a search operation.

When s=3, which indicates state 3, the genetic algorithmic operation state transition control unit 55 has reproduction process/crossover process unit 46 perform a carryover process, reproduction process and crossover process, and recruitment process unit 50 accept (recruit) new individuals.

Then, the problem solving operation apparatus continues its routine in step S5.

Step S5:

Upon receiving from the condition A determination unit 52, the condition B determination unit 53 and the condition C determination unit 54 the results of judgment of the satisfactions of their respective conditions, the genetic algorithmic operation state transition control unit 55 determines whether or not a state transition condition causing a state transition is satisfied. A negative determination (NO) causes a process of the genetic algorithmic operation state transition control unit 55 to revert to step S4 for repeating a search process in the same status. A positive determination (YES) causes the genetic algorithmic operation state transition control unit 55 to perform a process in step S6.

A state transition condition is expressed by expression (3) for a state transition from state 1 to state 2 or from state 2 to state 3, or condition A for a state transition from state 3 to state 1.

Step S6:

The genetic algorithmic operation state transition control unit 55 judges whether or not a terminating condition, e.g. the achievement of a predetermined maximum number of repetitions of performing a search process, is satisfied. A negative determination (NO) causes the genetic algorithmic operation state transition control unit 55 to perform a process in step S7. A positive determination (YES) causes the genetic algorithmic operation state transition control unit 55 to end the search by generating a control signal instructing an termination of the search process. Then the output unit 44 outputs as a solution an individual having the highest fitness value in a group belonging to the last generation.

Step S7:

The genetic algorithmic operation state transition control unit 55 updates the state transition flag value s to conform to the next state.

The genetic algorithmic operation state transition control unit 55 updates the state transition flag value s in a sequence of $1 \rightarrow 2 \rightarrow 3 \rightarrow 1$.

Then, the problems solving operation apparatus loops its routine back to step S3 shown in FIG. 15A, where the genetic algorithmic operation state transition control unit 55 generates a new control signal for performing a search process.

Described below are the processes of a problem solving operation apparatus shown in FIG. 14 with reference to FIGS. 16 through 21.

Figure 16:
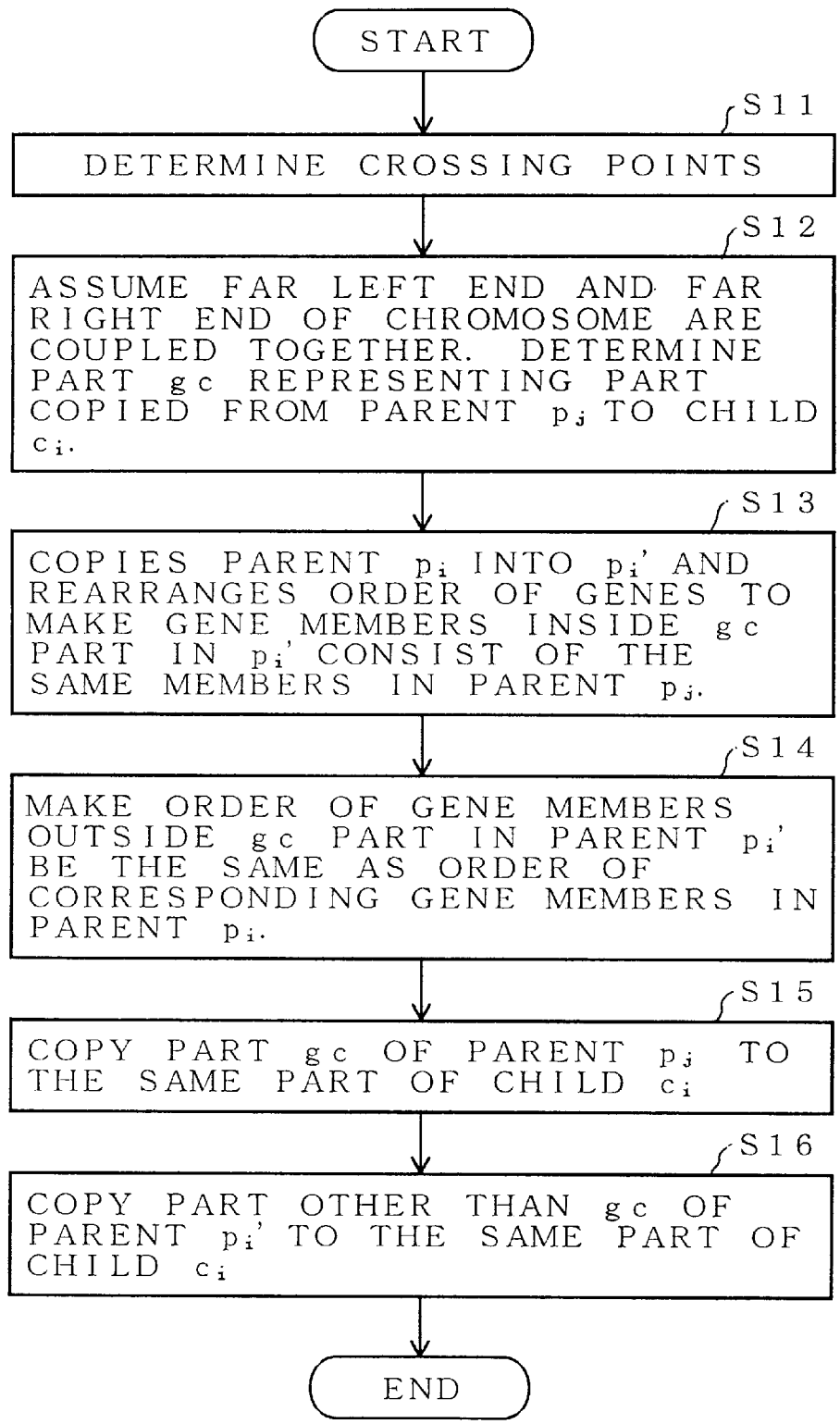
FIG. 16 is a flowchart, showing a crossover process.
Figure 17:
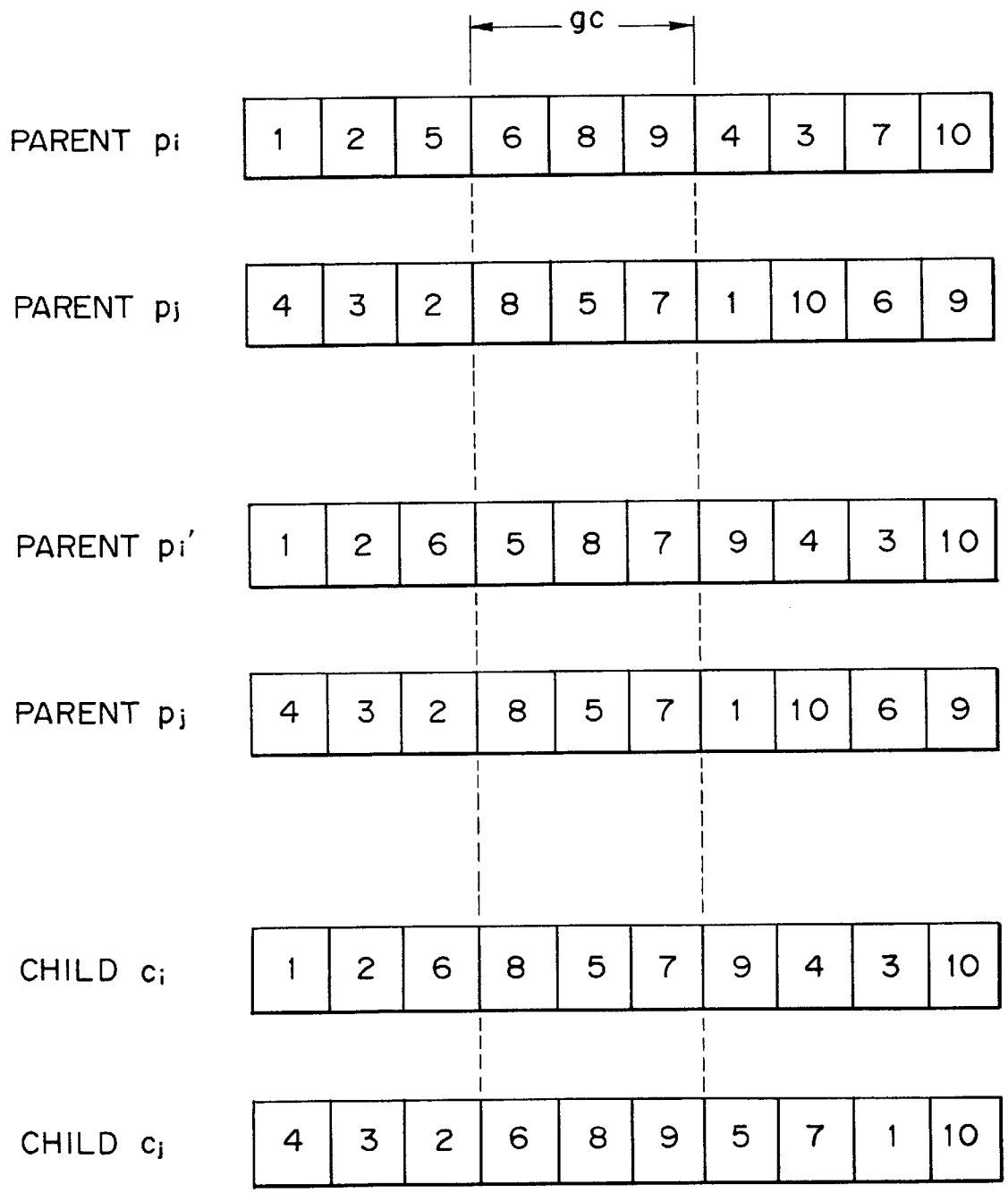
FIG. 17 is a map, exemplifying a chromosome change by a crossover process.

FIG. 16 is a flowchart, showing the crossover process. FIG. 17 is a map, exemplifying a chromosome change by the crossover process.

More specifically, FIG. 17 shows how the crossover process produces child chromosomes $c_i$ and $c_j$ from parent chromosomes $p_i$ and $p_j$ in an example of a chromosome comprising ten genes, where numbers 1 through 10 represent respective genes.

Step S11:

Upon starting its routine, the reproduction process/crossover process unit 46 determines two crossing points for parent chromosomes.

Then, the reproduction process/crossover process unit 46 continues its routine in step S12.

Step S12:

The reproduction/crossover process unit 46 determines a part gc to be copied from parent $p_j$ to child $c_i$.

It is assumed at this time that the far left end of each chromosome is continuously connected to the far right end. In an example shown in FIG. 17, three genes 8, 5 and 7 of parent $p_j$ are copied to child $c_i$ preserving the order of those genes.

Then, the reproduction process/crossover process unit 46 continues its routine in step S13.

Step S13:

The reproduction/crossover process unit 46 copies the parent $p_i$ into $p_i'$, and rearranges the order of the genes to make the gene members inside the gc part in $p_i'$ consist of the same gene members in $p_j$.

Then, the reproduction process/crossover process unit 46 continues its routine in step S14.

Step S14:

The reproduction process/crossover process unit 46 makes the order of the gene members outside the gc part in $p_i'$ be the same as the order of the corresponding gene members in $p_i$.

Then, the reproduction process/crossover process unit 46 continues its routine in step S15.

Step S15:

The reproduction/crossover process unit 46 copies genes in the part the gc of the parent $p_j$ to the part gc of child $c_i$.

Then, the reproduction process/crossover process unit 46 continues its routine in step S16.

Step S16:

the reproduction/crossover process unit 46 copies genes in the part other than the part gc of the parent $p_i'$ to the part other than the part gc of the child $c_i$.

Then, the reproduction process/crossover process unit 46 ends its routine.

In this way, reproduction process/crossover process unit 46 copies genes 8, 5 and 7 of the part gc of parent $p_j$ into the part gc of the child $c_i$, and the genes 1, 2 and 6 as well as genes 9, 4, 3 and 10 of the parent $p_i'$ to the part other than the part gc of the child $c_i$. Then, replacing the parent $p_i$ with the parent $p_j$, the reproduction process/crossover process unit 46 generates $p_j'$ (not shown) and the child $c_j$ in the same manner as described above.

Thus, the reproduction process/crossover process unit 46 generates two new chromosomes by partially swapping some genes (sequences of genes) of two original chromosomes in a consistent way. In this crossover process, original orders of genes in the original chromosomes are efficiently preserved in resulting chromosomes.

Figure 18:
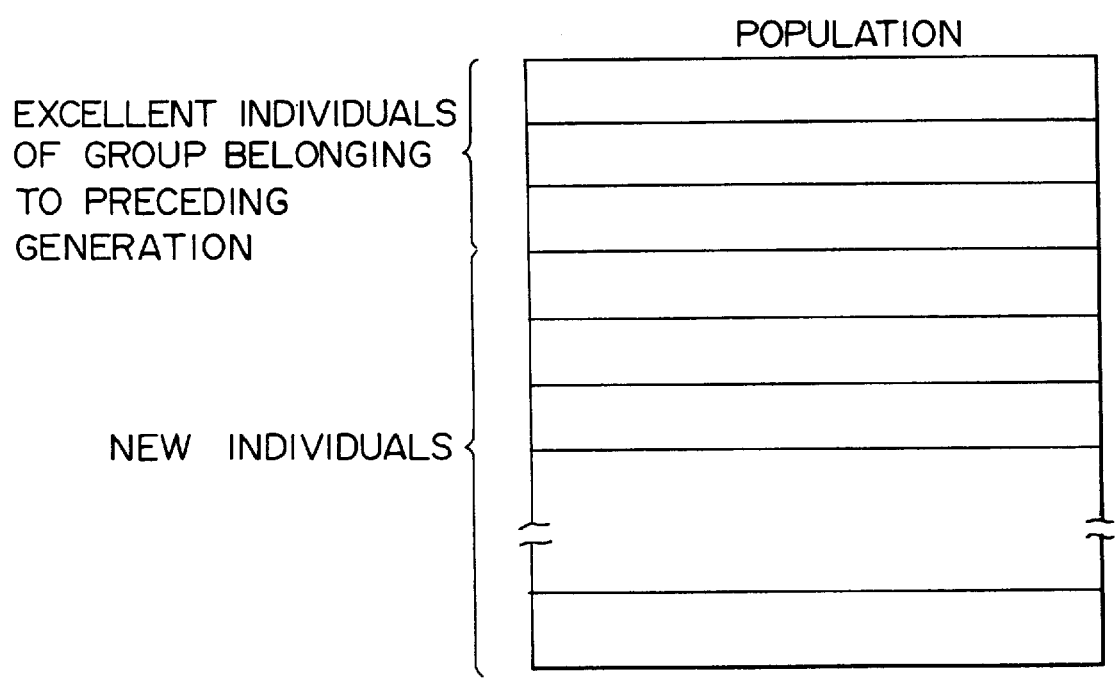
FIG. 18 is a sketch, showing an acceptance (recruitment) process.

FIG. 18 is a sketch, showing an acceptance (recruitment) process by the recruitment process unit 50.

The recruitment process unit 50 rearranges individuals of a group belonging to a preceding generation in the order of largeness of the fitness from one having the highest fitness value.

The recruitment unit 50 introduces new chromosomes (individuals) created by randomly generating genes of the respective chromosomes, thereby generating a population of a succeeding generation having an enhanced diversity of solution candidates. Excellent individuals with higher fitness values are carried over from the preceding generation by the reproduction process/crossover process unit 46.

Figure 19:
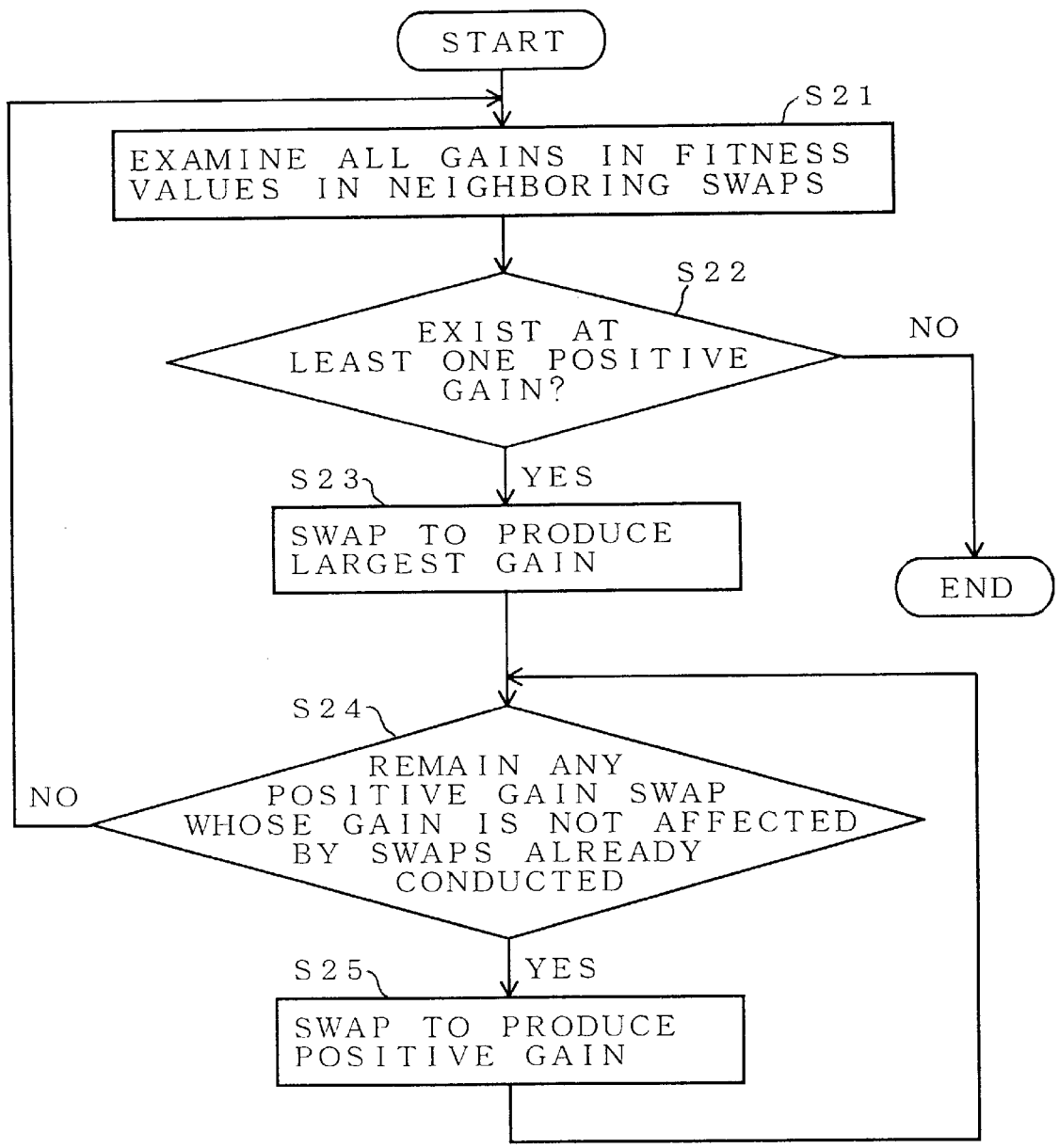
FIG. 19 is a flowchart, illustrating a hill climbing process.
Figure 20:
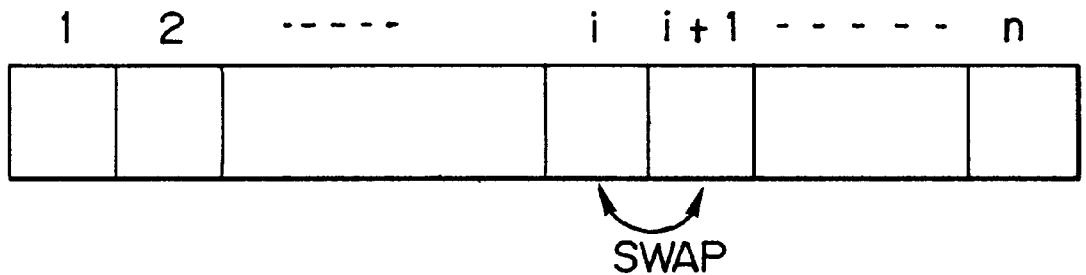
FIG. 20 is a map, exemplifying a swap of neighboring genes in a hill climbing process.

FIG. 19 is a flowchart, illustrating a hill climbing process by the hill climbing process unit 51. FIG. 20 is a map, exemplifying a swap of neighboring genes in a hill climbing process illustrated in FIG. 19.

Step S21:

Upon starting its routine, the hill climbing process unit 51 examines the increase (gain) in the fitness value after performing a swap between each neighboring genes, i.e. all the swaps between pairs of genes i and i+1 in a chromosome with each other.

Then, the hill climbing process unit 51 continues its routine in step S21.

Step S22:

The hill climbing unit 51 examines whether or not at least one swap with positive gain in fitness value is obtained as a result of step S21. The negative result of the examination (NO) causes the hill climbing process unit 51 to end its routine by outputting the current chromosome. The positive result of the examination (YES) causes the hill climbing process unit 51 to continue its routine in step S23.

Step S23:

The hill climbing unit 51 performs the swap having the largest gain in fitness value.

Then, the hill climbing process unit 51 continues its routine in step S24.

Step S24:

The hill climbing unit 51 examines whether or not any other swaps whose gain examined in the step S21 is not affected or influenced by the swaps already performed can result in a positive gain in fitness value. The positive result of the examination (YES) causes the hill climbing process unit 51 to continue its routine in step S25. The negative result of the examination (NO) causes the hill climbing process unit 51 to loop its routine back to step S21, thus repeating the steps from step S21 until the examination result indicates that swaps resulting in a positive gain in fitness value has been exhausted in step S22.

Step S25:

The hill climbing unit 51 performs the next swap to the swaps already performed, of the swaps examined in step S24 to result in positive gains in fitness values.

Then, the process of the hill climbing process unit 51 reverts to step S24 for repeating processes in steps S24 and S25 until the examination result in step S24 indicates that swaps resulting in a positive gain in fitness value has been exhausted.

The adoption of such a hill climbing process enables more excellent individuals to be selected in a shorter amount of time.

Figure 21:
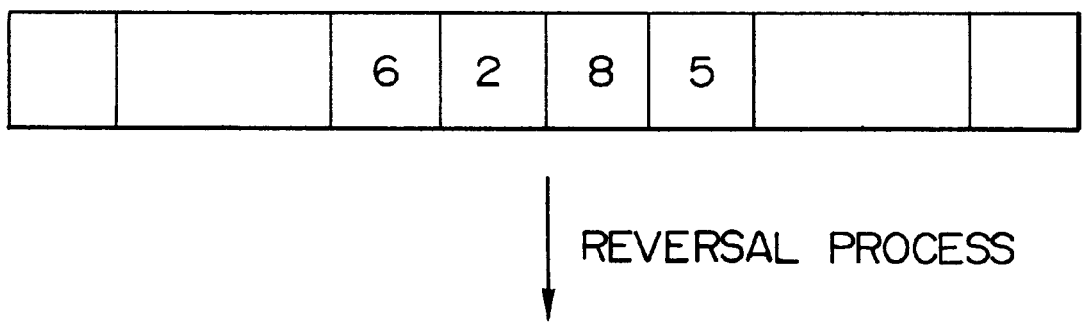
FIG. 21 is a map, exemplifying an inversion process.
Figure 21:
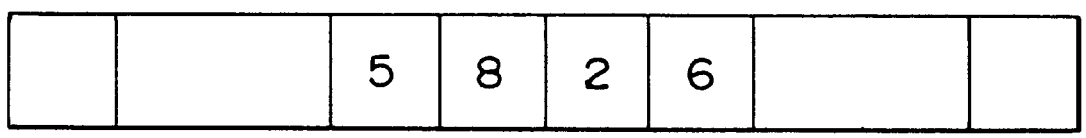

FIG. 21 is a map, exemplifying a reversal process or an inversion process by the reversal process unit 49.

The reversal unit 49 reverses a sequence of genes 6, 2, 8 and 5 in the chromosome, thereby generating a new chromosome having a sequence of genes 5, 8, 2 and 6 at that portion. In FIG. 8, this reversal process is classified into a the mutation operation set.

FIGS. 22, 23 and 24 are graphs, showing a result of a simulation using a genetic algorithm.

In FIGS. 22 through 24, "optimum" indicates an ideal fitness value (a fitness value of an optimum solution). "with state" indicates a result of introducing a concept of a state transition to the problem solving operation apparatus of this invention. "no state" indicates a result in state 0 without performing any state transitions.

More specifically, FIG. 23 is a cutout from FIG. 22 showing in detail the result for generations from zero 0 to 35000, and FIG. 24 is a cutout from FIG. 23 showing in detail the result for fitness values from 18000 to 20000.

The simulation assumes a population, i.e. the number of individuals in a group, of 16, the length of a chromosome of each individual to be 100, a crossover process probability of 1.0, a mutation process probability of 0.01, 6 individuals carried over from a preceding generation, and a reversal process probability of 0.1. The crossover process probability of 1.0 means that the problem solving operation apparatus has reproduction process/crossover process unit 46 determine crossing points with a probability of 1.0 by a calculation when making two children from two parents. In the crossover process with a probability of 0.8, it does not determine the crossing points by a calculation but make a parent simply to be a child with a probability of 0.2. The reversal process probability of 0.1 means that the problem solving operation apparatus has reversal process unit 49 perform the reversal process on a randomly determined part of a given chromosome with a probability of 0.1.

FIGS. 22, 23 and 24 clearly show that the introduction of the concept of a state transition enables the achievement of the ideal fitness value in a duration from $\frac{1}{3}$ to $\frac{1}{2}$ of the duration for the case without the introduction of the concept of the state transition, and that there may be cases in which the ideal value, i.e. the optimum value of the fitness value, is never reached without the use of the concept of the state transition.

Thus, the introduction of the concept of a state transition expedites a convergence of a fitness value to its optimum value. In that sequence, the hill climbing process in states 0, 1 and 2, the proximity search process in state 2, and the recruitment process to accept a new individuals in state 3 are effective in expediting the local convergence.

In a genetic algorithm, it is less effective in improving fitness values of the chromosomes in a group (population) to perform crossover processes after the diversity of the individuals within the group has become small. Thus, when the diversity of individuals is reduced, it is necessary to recover it by some method(s). An recruitment process is effective in recovering the diversity.

An ordinary mutation process causes a point in an n dimensional space representing an individual to move one time in a single generation. Yet, a hill climbing process and a proximity search process cause some moves in a single generation. Further, although the result of moving a point by an ordinary mutation process causes a fitness value to vary stochastically in a positive or negative direction, a hill climbing process and a proximity search process necessarily control such a change in a non-negative direction only. Thus, the use of these search techniques expedites the local search in a search space, and enhances a probability of moving an individual to a point having a larger fitness value in a shorter amount of time, i.e. in a fewer generations, compared with an ordinary mutation process. As a result, appropriate combinations of those techniques and a genetic algorithm expedite the global search in the search space.

The recruitment in state 3 is a process provided only for recovering a diversity. It enables the diversity of a group to be constantly maintained and solutions having high fitness values to be reached through a change of a part of the homogenized group of solution candidates with new solution candidates.

Although for the above description it is assumed that each state represents a search process combining a plurality of search techniques, it is also possible to use just one search technique, e.g. a proximity search only, in a search for an optimum solution in some states.

As described above in detail, this invention enables a solution of high quality to be obtained in an amount of time shorter than a conventional procedure, through the search for an optimum solution by repeating state transition between plural states each of which is representing a search process generally combining a plurality of optimization techniques. This invention is effective in expediting a problem solving operation for a mathematical programming problem such as a traveling salesman problem.

What is claimed is:

1. A problem solving operation apparatus for obtaining an optimum solution through a search in a search space for a solution of a problem, comprising:

search means for generating a plurality of optimum solution search states in a state transition diagram, each for searching said optimum solution of the problem using a combination of at least one optimum solution search technique, at least one of said optimum solution search states using a combination of at least two optimum solution search techniques;

search process observation and state transition means for observing an optimum solution search process for the problem in one of said plurality of optimum solution search states using at least one optimum solution search technique, and for causing a state transition in the state transition diagram to another one of said plurality of optimum solution search states using at least one different optimum solution search technique when a predetermined transition condition with respect to an efficiency of said optimum solution search process is satisfied in the one of said plurality of optimum solution search states;

memory means for storing a group of solution candidates for the problem;

first means for performing a first search on the group of solution candidates according to a first optimum solution search technique;

second means for performing a second search on the group of solution candidates according to a second optimum solution search technique;

objective value calculation means for calculating an objective value of each solution candidate of the group of solution candidates;

condition examination means for examining whether the transition condition is satisfied in the one of the optimum solution search states, based on the objective value, to produce an examination result; and state transition control means for outputting a control signal to control said first means, said second means, and said objective value calculation means based on the examination result from said condition examination means, and for combining operations of said first and second means to generate the at least one of the optimum solution search states with the at least two optimum solution search techniques using the control signal. satisfied in said optimum solution search process.

2. The problem solving operation apparatus according to claim 1, wherein said plurality of optimum search states correspond to a plurality of search states of a processing unit.

3. The problem solving operation apparatus according to claim 2, further comprising a plurality of cells for searching said optimum solution in parallel:

each of said plurality of cells comprising said processing unit.

4. The problem solving operation apparatus according to claim 1, further comprising a plurality of cells for searching said optimum solution in parallel, each of said plurality of cells comprising said search means, search process observation and state transition means, memory means, first means, second means, objective value calculation means, condition examination means, and state transition control means.

5. The problem solving operation apparatus according to claim 1, wherein said search process observation and state transition means comprises:

standard deviation observation means for observing a standard deviation of a plurality of solution candidates:

performance number observation means for observing number of repetition of search performances in a single state; and objective value change rate observation means for observing a change rate of an objective value between one of said plurality of solution candidates in a search performance and another one of said plurality of solution candidates in another search performance.

6. The problem solving operation apparatus according to claim 5, wherein said search process observation and state transition means further comprises state transition condition determination means for:

comparing each of observation results obtained respectively by said standard deviation observation means, said objective value change rate observation means with each of respective predetermined values; and determining whether to give an instruction of a state transition to said state transition control means by taking a comparison result into consideration.

7. The problem solving operation apparatus according to claim 1, wherein at least one of said plurality of optimum solution search states searches said optimum solution by using only one optimum solution search technique.

8. The problem solving operation apparatus according to claim 7, wherein said only one optimum solution search technique is a search technique based on a genetic algorithm.

9. The problem solving operation apparatus according to claim 1, wherein at least one of said plurality of optimum solution search states searches said optimum solution by applying a hill climbing technique to a solution candidate having a poor objective value.

10. A problem solving operation apparatus according to claim 1, wherein said first means includes crossover means for performing a crossover operation on two original individuals consistently preserving an order of a gene sequence in one of said original individuals, data of genes in said one of same original individuals being expressible of said order, thereby generating two resulting individuals; and optimum solution search means for searching said optimum solution of the problem using said crossover means.

11. A problem solving operation apparatus for obtaining an optimum solution through a search in a search space for a solution of a problem, comprising:

a plurality of optimum solution search means for searching said optimum solution of the problem in a state using a combination of at least one optimum solution search technique, at least one of said plurality of optimum solution search means including use of a search technique based on a genetic algorithm; and search process observation state and state transition means for observing an optimum solution search process for the problem by one of said plurality of optimum solution search means, and for causing a state transition to a search by another one of said plurality of optimum solution search means when a predetermined condition with respect to an efficiency of said optimal solution search process is satisfied in said optimum solution search process.

12. The problem solving operation apparatus according to claim 11, wherein said search technique based on said genetic algorithm comprising at least one of:

a reproduction process determining an individual in a group belonging to a present generation by randomly selecting one of individuals in a group belonging to a preceding generation;

a crossover process generating an individual by combining copies of portions of two individuals belonging to the preceding generation; and a mutation process changing at least one gene in an individual.

13. The problem solving operation apparatus according to claim 12, wherein said mutation process interchanges a pair of genes including one of said at least one gene.

14. The problem solving operation apparatus according to claim 11, wherein said search technique based on said genetic algorithm comprising at least one of:

a carryover process carrying over a first individual from a preceding generation;

an inversion process reversing a sequence of genes in a second individual;

a proximity search process changing at least one gene in a third individual, thereby improving an objective value of said third individual; and a recruitment process accepting a new individual.

15. A problem solving operation apparatus for obtaining an optimum solution through a search in a search space for a solution of a problem, comprising:

a plurality of optimum solution search means for searching said optimum solution of the problem in a state each using a combination of at least one optimum solution search technique;

search process observation state and state transition means for observing an optimum solution search process for the problem by one of said plurality of optimum solution search means, and for causing a state transition to a search by another one of said plurality of optimum solution search means when a predetermined condition with respect to an efficiency of said optimal solution search process is satisfied in said optimum solution search process;

memory means for storing a group of solution candidates for the problem;

reproduction and crossover means for performing on the group of solution candidates at least one of a reproduction operation of selecting a solution candidate in a preceding generation and a crossover operation of generating a solution candidate by combining copies of portions of two solution candidates belonging to the preceding generation;

mutation means for causing a mutation operation which partially changes a solution candidate in the group of solution candidates;

objective value calculation means for calculating an objective value of each solution candidate of said group of solution candidates;

condition examination means for examining whether the predetermined condition is satisfied using the objective value; and state transition control means for outputting a control signal to control said reproduction and crossover means, said mutation means, and said objective value calculation means, based on an examination result from said condition examination means, and for combining some operations of said reproduction and crossover means and said mutation means using the control signal.

16. The problem solving operation apparatus according to claim 15, further comprising:

carryover means for carrying over an excellent solution candidate from a preceding generation;

inversion means for reversing a sequence of values in a solution candidate;

proximity search means for performing a proximity search on said group of solution candidates; and recruitment means for accepting a new solution candidate into said group of solution candidates:

wherein:

said state transition control means combines operations of said reproduction and crossover means, said mutation means, said carryover means, said inversion means, said proximity search means, and said recruitment means, using said control signal.

17. The problem solving operation apparatus according to claim 15, further comprising hill climbing means for applying a hill climbing operation to said group of solution candidates, wherein:
said state transition control means combines operations of said reproduction and crossover means, said mutation means, and said hill climbing means, using said control signal.

18. The problem solving operation apparatus according to claim 15, further comprising a plurality of cells for searching said optimum solution in parallel and a parallel processing control means for controlling said plurality of cells:
each of said plurality of cells comprising said memory means, said reproduction and crossover means, said mutation means, said objective value calculation means, said condition examination means and said state transition control means.

19. A problem solving operation apparatus for obtaining an optimum solution through a search in a search space for a solution of a problem, comprising:
crossover means for performing an operation, including
determining means for determining two crossing points for first and second parent individuals, and for determining a crossover part between the two crossing points in the first and second parent individuals,
first child generating means for copying the first parent individual to a first temporary individual, for rearranging an order of genes in the first temporary individual to make genes in the crossover part consist of the same member in the crossover part of the second parent individual by replacing the genes in the crossover part of the first temporary individual with genes in parts on both sides of the crossover part, for making an order of genes in the parts on the both sides in the first temporary individual be the same as an order of corresponding genes in the first parent individual, for copying genes in the crossover part of the second parent individual to the crossover part of a first child individual, and for copying genes in the parts on the both sides in the first temporary individual to the parts on the both sides in the first child individual so that an original order of genes in the first parent individual is efficiently preserved in the first child individual, and
second child generating means for copying the second parent individual to a second temporary individual, for rearranging an order of genes in the second temporary individual to make genes in the crossover part of the second temporary individual consist of the same member in the crossover part of the first parent individual by replacing the genes in the crossover part of the second temporary individual with genes in parts on both sides of the crossover part, for making an order of genes in the parts on the both sides in the second temporary individual be the same as an order of corresponding genes in the second parent individual, for copying genes in the crossover part of the first parent individual to the crossover part of a second child individual, and for copying genes in the parts on the both sides in the second temporary individual to the parts on the both sides in the second child individual so that an original order of genes in the second parent individual is efficiently preserved in the second child individual; and
optimum solution search means for searching said optimum solution using said crossover means.

20. The problem solving operation apparatus according to claim 19, wherein said crossover means generates said resulting individuals by combining copies of portions of said original individuals in said crossover operation.

21. A problem solving method for use in obtaining an optimum solution through a search in a search space for a solution of a problem, comprising:
defining said problem and at least one parameter;
generating a group of solution candidates for said problem;
determining an objective function for defining an objective value of each solution candidate of said group of solution candidates;
determining a state transition control value for causing a state transition among a plurality of search states in a state transition diagram, based on said objective value of said objective function for each solution candidate;
performing an optimum solution search process for said problem by using said at least one parameter, in one of the search states with a combination having at least one of a carryover process of carrying over an excellent solution candidate from a preceding generation, a reproduction process of selecting a solution candidate of a group belonging to the preceding generation, a crossover process of generating a solution candidate by combining copies of portions of two solution candidates belonging to the preceding generation, a mutation process of partially changing a solution candidate, a proximity search process, and a hill climbing process, in accordance with said state transition control value;
examining whether a predetermined transition condition is satisfied in the one of the search states using the objective value; and
causing a state transition in the state transition diagram to another one of the search states with another combination having at least two of the processes by changing said state transition control value according to the transition condition in the one of the search states.

22. A problem solving method for use in obtaining an optimum solution through a search in a search space for a solution of a problem, comprising:
defining the problem and at least one parameter;
generating a group of solution candidates for the problem;
determining an objective function for defining an objective value of each solution candidate of the group of solution candidates;
determining a state transition control value, based on the objective value of the objective function for each solution candidate;
performing an optimum solution search process for the problem by using the at least one parameter, through a combination having at least one of a carryover process of carrying over an excellent solution candidate from a preceding generation, a reproduction process of selecting a solution candidate of a group belonging to the preceding generation, a crossover process of generating a solution candidate by combining copies of portions of two solution candidates belonging to the preceding generation, a mutation process of partially changing a solution candidate, a proximity search process, and a hill climbing process, in accordance with the state transition control value, the hill climbing process including the steps of:
examining a gain in the objective value, upon swapping two genes in a starting solution of the hill climbing process selected out of said the group of solution candidates;

performing a swap that results in a largest gain in the objective value;

repeating a swap of two adjoining genes that results in a positive gain, except an influenced swap whose gain examined in said examining has been influenced by other swaps which have already been performed until results with a positive gain are exhausted, thereby obtaining an intermediate solution;

repeating said examining, and said performing and repeating of the swap using the intermediate solution as the starting solution; and terminating operations, after a set of swaps with a positive gain is exhausted, thereby obtaining a final solution of the hill climbing process; and selecting an optimum solution search process for the problem with another combination by changing the state transition control value.

23. A problem solving operation apparatus for obtaining an optimum solution through a search in a space for a solution of a problem, comprising:

crossover means, including determining means for determining two crossing points for first and second parent individuals, and for determining a crossover part between the two crossing points in the first and second parent individuals, and child generating means for copying the first parent individual to a temporary individual, for rearranging an order of genes in the temporary individual to make genes in the crossover part of the temporary individual consist of the same members in the crossover part of the second parent individual by replacing the genes in the crossover part of the temporary individual with genes in parts on both sides of the crossover part, for making an order of genes in the parts on the both sides in the temporary individual be the same as an order of corresponding genes in the first parent individual, for copying genes in the crossover part of the second parent individual to the crossover part of a child individual, and for copying genes in the parts on the both sides in the temporary individual to the parts on the both sides in the child individual so that an original order of genes in the first parent individual is efficiently preserved in the child individual; and optimum solution search means for searching said optimum solution using said crossover means.

* * * * *

UNITED STATES PATENT AND TRADEMARK OFFICE
CERTIFICATE OF CORRECTION

PATENT NO.: 6,052,678
DATED : April 18, 2000
INVENTOR(S): Hiroyasu ITOH, et al.

It is certified that errors appear in the above-identified patent and that said Letters Patent is hereby corrected as shown below:

Col. 16, line 33, delete "satisfied in said optimum solution search process".

Col. 20, line 66, delete "said".

Signed and Sealed this

Sixth Day of February, 2001

Attest:

Q. TODD DICKINSON

*Attesting Officer*  *Director of Patents and Trademarks*